(12) United States Patent
Young et al.

(10) Patent No.: US 9,272,259 B2
(45) Date of Patent: Mar. 1, 2016

(54) METAL HYDRIDE ALLOYS HAVING IMPROVED ACTIVATION AND HIGH RATE PERFORMANCE

(75) Inventors: Kwo Young, Troy, MI (US); Benjamin Reichman, West Bloomfield, MI (US); Michael A. Fetcenko, Rochester, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 641 days.

(21) Appl. No.: 13/450,763

(22) Filed: Apr. 19, 2012

(65) Prior Publication Data
US 2013/0277607 A1 Oct. 24, 2013

(51) Int. Cl.
H01K 1/56 (2006.01)
B01J 20/02 (2006.01)
C01B 3/00 (2006.01)

(52) U.S. Cl.
CPC .............. *B01J 20/02* (2013.01); *C01B 3/0031* (2013.01); *C22C 2202/04* (2013.01); *Y02E 60/327* (2013.01)

(58) Field of Classification Search
USPC .............. 429/23, 223, 209; 427/126.3, 126.6; 252/182.1
See application file for complete search history.

(56) References Cited

U.S. PATENT DOCUMENTS

| | | | |
|---|---|---|---|
| 4,195,989 | A | 4/1980 | Gamo et al. |
| 5,277,998 | A | 1/1994 | Furukawa et al. |
| 5,512,385 | A | 4/1996 | Komori et al. |
| 5,536,591 | A | 7/1996 | Fetcenko et al. |
| 5,962,156 | A | 10/1999 | Izumi et al. |
| 6,210,498 | B1 | 4/2001 | Ovshinsky et al. |
| 2005/0067060 | A1 | 3/2005 | Huang et al. |

OTHER PUBLICATIONS

Antonio Rodolfo dos Santos et al., Electrochemical and structural studies on nonstoichiometric AB2-type metal hydride alloys, International Journal of Hydrogen Eneergy 29 (2004) 1253-1261.*

He Miao et al., Effects of Y substitution for Ti on the Microstructure and Electrochemical Properties of ti—V—Fe-based Hydrogen Storage Alloys, Journal of the Electrochemmical Socieyt, 154 (11) A1010-A1014 (2007).*

"Electrochemical and structural studies on nonstoichiometric $AB_2$-type metal hydride alloys", A.R. dos Santos, International Journal of Hydrogen Energy 29 (2004) 1253-1261.

"Effects of Y Substitution for Ti on the Microstructure and Electrochemical Properties of Ti—V—Fe-based Hydrogen Storage Alloys", H. Miao, Journal of the Electrochemical Society 154 (2007) A1010-A1014.

"Effects of rare earth elements substitution for Ti on the structure and electrochemical properties of a Fe-doped Ti—V-based hydrogen storage alloy", Mingxia Gao, Journal of Alloys and Compounds 484 (2009) 249-255.

"Effects of Y Substitution for La on the Microstructure and Electrochemical Properties of $LaNi_{3.55}Mn_{0.4}Al_{0.3}Co_{0.75}$ Hydrogen Storage Alloys", W. Li, Materials Transactions, vol. 49, No. 10. (2006) 2229-2232.

"Study of the corrosion resistance of Cr, Zr, Y doped $AB_5$ type alloys in KOH", O. Amaud, Journal of Alloys and Compounds, 330-332 (2002) 262.

"Effects of yttrium on the corrosion of $AB_5$-type alloys for nickel-metal hydride batteries", F. Maurel, Journal of Alloys and Compounds, 309 (2000) 88-94.

"Effects of yttrium additions on the electrode performance of magnesium-based hydrogen storage alloys", N. Cui, Journal of Alloys and Compounds 233 (1996) 236-240.

Effects of metal additive on electrochemical performances of Mg-based hydrogen storage materials prepared by hydriding combustion synthesis and subsequent mechanical milling (HCS + MM):, Wenfang Zhang, International Journal of Hydrogen Energy 35 (2010) 8241-8246.

International Search Report and Written Opinion for International Application No. PCT/US2013/037125; Jul. 25, 2013.

* cited by examiner

*Primary Examiner* — Monique Peets
(74) *Attorney, Agent, or Firm* — Dinsmore & Shohl LLP

(57) ABSTRACT

A multi-phase metal hydride alloy material which is capable of reversibly absorbing and desorbing hydrogen includes a first main phase or group of phases having an $AB_x$ type crystalline structure and a second phase which has a concentration of a modifier element therein which is greater than the concentration of the modifier element in the first phase or group of phases. The modifier element functions to promote the formation of the second phase and may comprise a light rare earth element such as yttrium. The first phase or group of phases may incorporate one or more Laves phases such as a C14, C15, and/or C36 phase. Further disclosed are metal hydride batteries including the alloys.

15 Claims, 21 Drawing Sheets

METAL HYDRIDE ALLOYS HAVING IMPROVED ACTIVATION AND HIGH RATE PERFORMANCE

FIELD OF THE INVENTION

This invention relates to alloy materials and methods for their fabrication. In particular, the invention relates to metal hydride alloy materials which are capable of absorbing and desorbing hydrogen. In particular, the invention relates to a multi-phase metal hydride type alloy material which includes a modifier element therein.

BACKGROUND OF THE INVENTION

As is known in the art, certain alloy materials are capable of absorbing and desorbing hydrogen. These materials can be used as hydrogen storage media and/or as electrode materials for metal hydride batteries, fuel cells, metal hydride air battery systems, and the like. Such materials are known generally as metal hydride materials.

One particular class of metal hydride materials having utility in metal hydride battery systems is known as the $AB_x$ class of materials with reference to the crystalline sites that its members component elements occupy. $AB_x$ type materials are disclosed for example in U.S. Pat. No. 5,536,591 and U.S. Pat. No. 6,210,498, the disclosures of both of which are incorporated herein by reference. Presently, there is significant interest in utilizing a particular group of $AB_x$ materials referred to as $AB_2$ alloys in metal hydride battery systems. This is due to the fact that $AB_2$ type materials, unlike many of the presently used $AB_5$ alloy materials, generally do not incorporate significant amounts of expensive, rare earth elements. Furthermore, batteries incorporating $AB_2$ materials generally exhibit high charge storage capacities.

As is recognized in the art, before being placed into service, metal hydride batteries must be subjected to an activation process. This process typically comprises putting the batteries through one or more particularly profiled charge/discharge cycles, and is necessary in order to assure that the battery manifest its maximum charge storage capacity. High-rate capability is another significant parameter of any battery system and is a measure of the battery's ability to deliver energy at a high rate. High-rate capability is a very important parameter in high power applications such as electric vehicles, power tools, and the like wherein large amounts of power must be supplied rapidly.

Heretofore, the utility of $AB_2$ materials in metal hydride battery systems has been limited by the fact that they tend to be hard to activate and show low high-discharge rate capabilities, as compared to $AB_5$ materials and the like. As will be explained in detail hereinbelow, the present invention recognizes that the activation and high-rate properties of $AB_2$ metal hydride alloys are significantly improved if those alloys include a catalytic secondary phase. Further in accord with the present invention, it has been found that these phases can be formed by the introduction of a modifier element into the alloy material.

Materials of the present invention include at least a first and a second phase. The first phase (which may comprise a group of phases) has an $AB_2$ type crystalline structure, and is also referred to as the "main phase". The second phase includes concentrations of the modifier element which are significantly higher than concentrations in the first phase. The materials of the present invention are relatively low in cost, and when incorporated into metal hydride battery systems manifest large charge storage capacities together with significantly improved activation and high-rate discharge properties. These and other advantages of the present invention will be apparent from the drawings, discussion, and description which follow.

SUMMARY OF THE INVENTION

Disclosed is a metal hydride alloy material which includes a modifier element therein. The alloy comprises a first phase or group of phases having an $AB_x$ type crystalline structure and a second phase which has a concentration of the modifier element therein which is greater than the concentration of the modifier element in the first phase or group of phases. The alloy is capable of reversibly absorbing and desorbing hydrogen. In particular instances, the first, main phase or group of phases has a $AB_2$ type crystalline structure. In particular instances, the concentration of the modifier element in the second phase is at least 10 times, and in some instances at least 50 times or 100 times, greater than the concentration of the modifier element in the first group of phases. In certain embodiments, the second phase is a non-crystalline phase, or if it is crystalline it has a crystalline structure different from the crystalline structure of the main phase.

The concentration of the modifier element in the bulk of the alloy is, in some instances, greater than 0 and equal to or less than 4 atomic percent. The modifier element may be a light rare earth element such as yttrium. The alloy, in some instances, may include Ti, Zr, B, Ni, and the modifier element. In particular instances, the first phase or group of phases may include one or more Laves phases such as a C14, C15, and/or C36 phase.

In particular instances the alloy has the general formula:

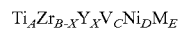

$$Ti_A Zr_{B-X} Y_X V_C Ni_D M_E$$

wherein A, B, C, and D are each independently greater than 0 and less than or equal to 50 atomic percent; X is greater than 0 and less than or equal to 4 atomic percent; M is one or more metals selected from the group consisting of Co, Cr, Sn, Al, and Mn; and E is in the range of 0-30 atomic percent.

Also disclosed are batteries which include the alloy material.

DETAILED DESCRIPTION OF THE PREFERRED EMBODIMENTS

Figure 1:
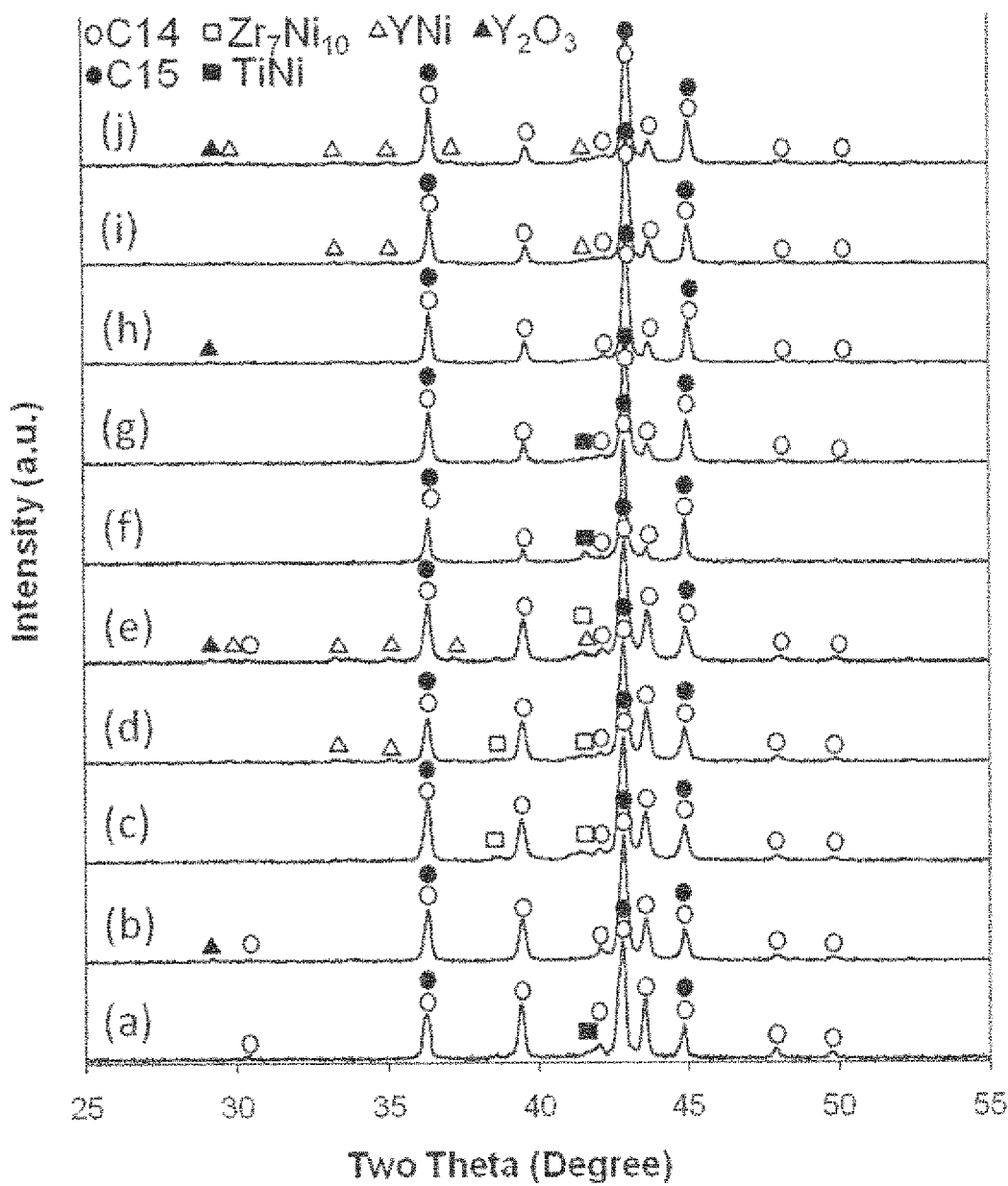
FIG. 1 is a depiction of the x-ray diffraction data for a series of ten alloys illustrative of the principles of the present invention.

The present invention is directed to multi-phase $AB_2$ alloys which manifest improved activation and high-rate discharge capabilities. As is known in the art, $AB_2$ type metal hydride alloy materials may often include several distinct phases therein, such as $C_{14}$ and $C_{15}$ phases which are known in the art. However, it is to be noted that these phases all manifest an $AB_2$ crystalline structure. Hence, in this disclosure the $AB_2$ main phase component of the alloy is referred to as being "a first phase or group of phases." In differentiation from the prior art, the alloys of the present invention include a modifier element therein which promotes the formation of a distinct phase referred to herein as the "catalytic phase" or "second phase." As will be detailed hereinbelow, the concentration of the modifier element in this second phase is significantly higher than in the first, main, phase or group of phases having the $AB_2$ crystalline structure. While not wishing to be bound by speculation, Applicant suggests that the presence of this second, catalytic, phase accounts for the improved activation and high rate properties of the alloys of the present invention.

As is known in the art, there are a large number of elements which may be utilized to form $AB_2$ type metal hydride materials and these elements can include, but are not limited to, Ti, Zr, V, Cr, Mn, Co, Ni, Sn, Si, B, Al, as well as smaller amounts of other metals and nonmetals.

There are a number of elements which may be utilized as modifiers in the present invention. The modifier elements are selected so as to occupy the A site in the $AB_2$ crystalline structure and substitute for an element or elements of the $AB_2$ structure normally present at that site. While not wishing to be bound by speculation, Applicant believes that the presence of the modifier element may disrupt or distort the crystalline structure of portions of the $AB_2$ material thereby beneficially altering its electrochemical properties. Given the teaching presented herein one of skill in the art can readily select an appropriate modifier element based upon knowledge of its atomic radius and electronegativity, so as to allow it to substitute for particular A site elements in the $AB_2$ alloy. One group of modifier elements having utility in the present invention comprise rare earth elements, and in particular light rare earth elements such as yttrium (Y).

Typically, the modifier element will be present in the bulk of the alloy of the present invention in concentrations of no more than 10 atomic percent, and in specific instances no more than 5 atomic percent. In some specific instances, optimum concentrations have been found to be in the range of 2-4 atomic percent. As will be detailed hereinbelow, analysis of the materials of the present invention suggests that the concentration of modifier element is significantly greater in the second, catalytic, phase of the material of the present invention than it is in the main $AB_2$ structured phase or group of phases. In many instances, the concentration of modifier in the second phase is at least 10 times greater than in the first phase or group of phases. In particular instances, concentration in the second phase is at least 50 times that in the first phase or group of phases; and in some instances, the concentration in the second phase is at least 100 times greater than in the first phase or group of phases. The second phase may, in some instances, have a microstructure which differs from the crystalline microstructure of the $AB_2$ main phase or phases. In this regard the structure of the second phase may also be crystalline or it may be noncrystalline.

The present invention is illustrated by a series of experiments in which ten separate groups of $AB_2$ alloy materials were prepared and evaluated. The alloy materials were typical $AB_2$ materials and comprised a base composition of Ti, Zr, V, Cr, Mn, Co, Ni, Sn, and Al. In this experimental series, yttrium was employed as a modifier element and its concentration was varied over a range of 0-4 atomic percent. (Unless otherwise noted, all concentrations stated in this disclosure are in terms of atomic percent.) A first group of materials, designated the 177 series, included relatively high chromium concentrations with regard to its cobalt concentrations, while a second series of materials, designated the 193 series, had a lower chromium to cobalt concentration. Materials were prepared in accord with standard practices in the art and their properties were evaluated with regard to structure, composition, and hydrogen absorption and desorption properties. The materials were also incorporated into metal hydride battery cells and evaluated with regard to their electrochemical performance.

The present invention as described with particular reference to multi-phase $AB_2$ MH materials can also be implemented with regard to other multi-phase MH materials, such as $AB_3$ and similar derivative alloys made by inserting various numbers of $AB_5$ (1 to 4) layers between $A_2B_4$ layers, such as $A_2B_7$, $A_5B_{19}$, and $AB_4$ alloys.

EXPERIMENTAL

The alloy samples used in this study were prepared by an arc melting process carried out under a continuous argon flow with a non-consumable tungsten electrode and a water-cooled copper tray. Before each run, a piece of sacrificial titanium underwent a number of melting-cooling cycles so as to reduce the residual oxygen concentration. Each 12-gram ingot was remelted and turned over a few times to ensure uniformity in chemical composition. The chemical composition of each sample was examined utilizing a Varian Liberty 100 inductively-coupled plasma (ICP) system. A Philips X'Pert Pro x-ray diffractometer (XRD) was used to study the microstructure, and a JOEL-JSM6320F scanning electron microscopy (SEM) with energy dispersive spectroscopy (EDS) capability was used to study the phase distribution and composition. PCT characteristics for each sample were measured using a Suzuki-Shokan multi-channel PCT system. In the PCT analysis, each sample was first activated by a 2-h thermal cycle between 300° C. and room temperature at 25 atm $H_2$ pressure. The PCT isotherms at 30 and 60° C. were then measured. The materials were then incorporated into metal hydride battery cells in accord with prior art techniques as disclosed, for example in the publications: K. Young, M. A. Fetcenko, T. Ouchi, F. Li, J. Koch, *J. Alloys Compd.* 464 (2008) 238; and K. Young, M. A. Fetcenko, J. Koch, K. Morii, T. Shimizu, *J. Alloys Compd.* 486 (2009) 559; the disclosures of which are incorporated herein by reference.

Two series of alloys (177)—$Ti_{12}Zr_{21.5-x}Y_x V_{10}Cr_{8.5}Mn_{5.6}Co_{1.5}Ni_{40.2}Sn_{0.3}Al_{0.4}$ and (193)—$Ti_{12}Zr_{21.5-x} Y_x V_{10}Cr_{3.5}Mn_{4.1}Co_{8.0}Ni_{40.2}Sn_{0.3}Al_{0.4}$, x=0 to 4) were designed with partial substitution of Zr by Y. The base alloys (177 and 193) for these two series were chosen based on earlier studies of C14/C15-mixed structures and influences from phase abundance and stoichiometry. The designed composition, average electron density (e/a), and B/A stoichiometric ratio for each alloy have been listed in Table 1.

TABLE 1

Designed compositions and ICP results in at. %

| Alloy number | | Ti | Zr | V | Cr | Mn | Co | Ni | Sn | Al | Y | e/a | B/A |
|---|---|---|---|---|---|---|---|---|---|---|---|---|---|
| 177 | Design | 12.0 | 21.5 | 10.0 | 8.5 | 5.6 | 1.5 | 40.2 | 0.3 | 0.4 | 0.0 | 6.951 | 1.99 |
| | ICP | 12.2 | 21.6 | 10.2 | 8.4 | 4.8 | 1.5 | 40.6 | 0.3 | 0.5 | 0.0 | 6.954 | 1.96 |
| 177Y1 | Design | 12.0 | 20.5 | 10.0 | 8.5 | 5.6 | 1.5 | 40.2 | 0.3 | 0.4 | 1.0 | 6.941 | 1.99 |
| | ICP | 12.2 | 20.5 | 10.0 | 8.4 | 5.2 | 1.5 | 40.4 | 0.3 | 0.4 | 1.0 | 6.935 | 1.96 |
| 177Y2 | Design | 12.0 | 19.5 | 10.0 | 8.5 | 5.6 | 1.5 | 40.2 | 0.3 | 0.4 | 2.0 | 6.931 | 1.99 |
| | ICP | 12.4 | 19.8 | 10.0 | 8.2 | 4.8 | 1.5 | 40.5 | 0.4 | 0.5 | 1.9 | 6.929 | 1.93 |
| 177Y3 | Design | 12.0 | 18.5 | 10.0 | 8.5 | 5.6 | 1.5 | 40.2 | 0.3 | 0.4 | 3.0 | 6.921 | 1.99 |
| | ICP | 12.4 | 18.5 | 10.1 | 8.3 | 4.1 | 1.5 | 41.2 | 0.3 | 0.6 | 2.9 | 6.928 | 1.96 |
| 177Y4 | Design | 12.0 | 17.5 | 10.0 | 8.5 | 5.6 | 1.5 | 40.2 | 0.3 | 0.4 | 4.0 | 6.911 | 1.99 |
| | ICP | 12.3 | 17.6 | 10.2 | 8.5 | 4.4 | 1.5 | 40.9 | 0.4 | 0.5 | 3.8 | 6.934 | 1.97 |
| 193 | Design | 12.0 | 21.5 | 10.0 | 3.5 | 4.1 | 8.0 | 40.2 | 0.3 | 0.4 | 0.0 | 7.131 | 1.99 |
| | ICP | 12.0 | 21.4 | 10.1 | 3.6 | 3.5 | 8.1 | 40.5 | 0.4 | 0.4 | 0.0 | 7.149 | 1.99 |
| 193Y1 | Design | 12.0 | 20.5 | 10.0 | 3.5 | 4.1 | 8.0 | 40.2 | 0.3 | 0.4 | 1.0 | 7.121 | 1.99 |
| | ICP | 11.9 | 20.4 | 10.2 | 3.6 | 3.7 | 8.1 | 40.3 | 0.3 | 0.3 | 1.1 | 7.120 | 1.99 |
| 193Y2 | Design | 12.0 | 19.5 | 10.0 | 3.5 | 4.1 | 8.0 | 40.2 | 0.3 | 0.4 | 2.0 | 7.111 | 1.99 |
| | ICP | 12.0 | 19.2 | 10.0 | 3.5 | 3.5 | 8.0 | 40.8 | 0.3 | 0.5 | 2.2 | 7.126 | 1.99 |
| 193Y3 | Design | 12.0 | 18.5 | 10.0 | 3.5 | 4.1 | 8.0 | 40.2 | 0.3 | 0.4 | 3.0 | 7.101 | 1.99 |
| | ICP | 12.2 | 18.5 | 10.0 | 3.5 | 3.4 | 8.0 | 40.7 | 0.4 | 0.5 | 2.9 | 7.124 | 1.98 |
| 193Y4 | Design | 12.0 | 17.5 | 10.0 | 3.5 | 4.1 | 8.0 | 40.2 | 0.3 | 0.4 | 4.0 | 7.091 | 1.99 |
| | ICP | 12.1 | 17.6 | 10.1 | 3.5 | 3.0 | 8.0 | 41.0 | 0.3 | 0.6 | 3.7 | 7.104 | 1.99 |

According to the designed compositions, the two series of alloys were stoichiometric $AB_2$ alloys with the dominating phase being C14 for the 177-series and the dominating phase being C15 for the 193-series due to Cr and Co having different numbers of outer-shell electrons (six and nine, respectively). The ICP results, shown in the same table, were close to the designed values except for small Mn-inhomogeneities present in the arc-melted samples. The calculated e/a values and B/A ratios based on the average alloy compositions from ICP analysis were very close to the designed values.

Structural analyses of the thus-prepared alloys were carried out, and the XRD patterns of the 10 alloys are shown in FIG. 1. All the major peaks could be fit into hexagonal C14 ($MgZn_2$) and face-center-cubic C15 ($MgCu_2$) structures with many overlaps. Besides the Laves phases, minor phases, such as TiNi, $Zr_7Ni_{10}$, YNi, and $Y_2O_3$, were also present. The lattice constants, a/c aspect ratio, and unit cell volumes of the C14 and C15 phases calculated from the XRD pattern for each alloy have been listed in Table 2 hereinbelow.

TABLE 2

Summary of XRD and gaseous phase storage properties of alloys in this study.

| Alloy number | C14 lattice constant a (Å) | C14 lattice constant c (Å) | a/c aspect ratio | C14 unit cell volume (Å³) | C14 crystallite size (Å) | C15 lattice constant a (Å) | C15 unit cell volume (Å³) | C15 crystallite size (Å) |
|---|---|---|---|---|---|---|---|---|
| 177 | 4.977 | 8.138 | 0.6115 | 174.6 | 638 | 7.017 | 345.6 | 407 |
| 177Y1 | 4.970 | 8.110 | 0.6128 | 173.5 | 503 | 7.012 | 344.8 | 505 |
| 177Y2 | 4.970 | 8.113 | 0.6126 | 173.5 | 514 | 7.013 | 344.9 | 453 |
| 177Y3 | 4.966 | 8.121 | 0.6116 | 173.4 | 430 | 7.011 | 344.7 | 470 |
| 177Y4 | 4.963 | 8.104 | 0.6124 | 172.8 | 479 | 7.008 | 344.2 | 458 |
| 193 | 4.978 | 8.112 | 0.6137 | 174.1 | 872 | 7.003 | 343.4 | 647 |
| 193Y1 | 4.961 | 8.088 | 0.6133 | 172.4 | >1000 | 6.998 | 342.7 | 595 |
| 193Y2 | 4.956 | 8.092 | 0.6124 | 172.1 | >1000 | 6.994 | 342.1 | 646 |
| 193Y3 | 4.954 | 8.069 | 0.6140 | 171.5 | 859 | 6.989 | 341.4 | 736 |
| 193Y4 | 4.952 | 8.073 | 0.6134 | 171.5 | 667 | 6.987 | 341.0 | 672 |

| Alloy number | C14 phase abundance (%) | C15 phase abundance (%) | $Zr_7Ni_{10}$ phase abundance (%) | TiNi phase abundance (%) | YNi phase abundance (%) | $Y_2O_3$ phase abundance (%) |
|---|---|---|---|---|---|---|
| 177 | 74 | 11 | ND | 15 | ND | ND |
| 177Y1 | 40 | 60 | ND | ND | ND | 0.6 |
| 177Y2 | 37 | 56 | 4 | ND | 3 | ND |
| 177Y3 | 41 | 54 | 2 | ND | 3 | ND |
| 177Y4 | 40 | 54 | 1 | ND | 4 | 0.7 |
| 193 | 32 | 67 | ND | 1 | ND | ND |
| 193Y1 | 13 | 84 | ND | 3 | ND | ND |
| 193Y2 | 17 | 83 | ND | ND | ND | 0.6 |
| 193Y3 | 11 | 89 | ND | ND | ND | ND |
| 193Y4 | 18 | 79 | ND | ND | 2 | 0.5 |

Figure 2:
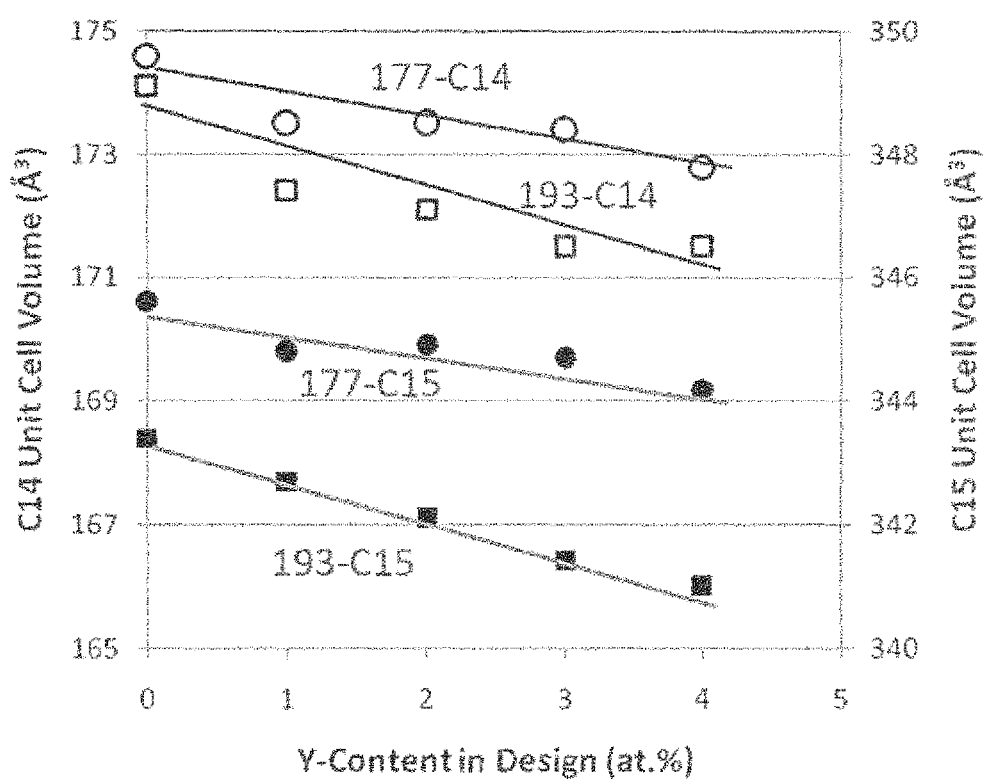
FIG. 2 is a depiction of the change in unit cell volume as a function of modifier element concentration for a series of alloys in accord with the present invention.

As the Y-content increased in both series of alloys, the lattice constants a and the unit cell volumes of both C14 and C15 phases decreased. The lattice constants c in the Si-containing alloys are smaller than that in the Si-free alloy. Y, with its larger metallic radius in the Laves phase alloy (1.990 Å) when compared to the replaced Zr (1.771 Å), was expected to increase the unit cell volume (assuming that the distribution of Y was uniform throughout the alloy). This finding of unit cell shrinkage with Y-addition (as shown in FIG. 2) will be further discussed hereinbelow.

The C14 and C15 crystallite sizes of each alloy were estimated by the Scherrer equation using the full-width at half maximum (FWHM) of the C14 (103) and C15 (220) peaks in the XRD pattern and have been listed in Table 2. The Y-containing alloys in the 177-series had smaller C14 and larger C15 crystallites when compared to the base alloy while changes in crystallite sizes in the 193-series of alloys did not follow any trend.

The microstructures for the two series of alloys were studied with SEM, and the back-scattering electron images (BEI) for the Y-doped alloys are presented in FIGS. 3a-3h. Samples were mounted and polished on epoxy blocks, which were then rinsed and dried before entering the SEM chamber. The compositions in several areas (identified numerically in the micrographs) were studied with EDS; the results have been listed in Table 3. The B/A ratios and e/a values calculated based on the compositions have been listed in the same table. All alloys were composed of $AB_2$ as the main phase and one or more secondary phases (AB, $Zr_7Ni_{10}$, (Y, Sn)-rich, or $Y_2O_3$). The compositions of the main $AB_2$ phase have been highlighted in bold in the table and their Zr, Ti, and Y-contents have been plotted in FIGS. 4a and 4b as functions of the designed Y-content.

TABLE 3

EDS results in at. % from areas identified in SEM micrographs (FIG. 3).

Figure 3A:
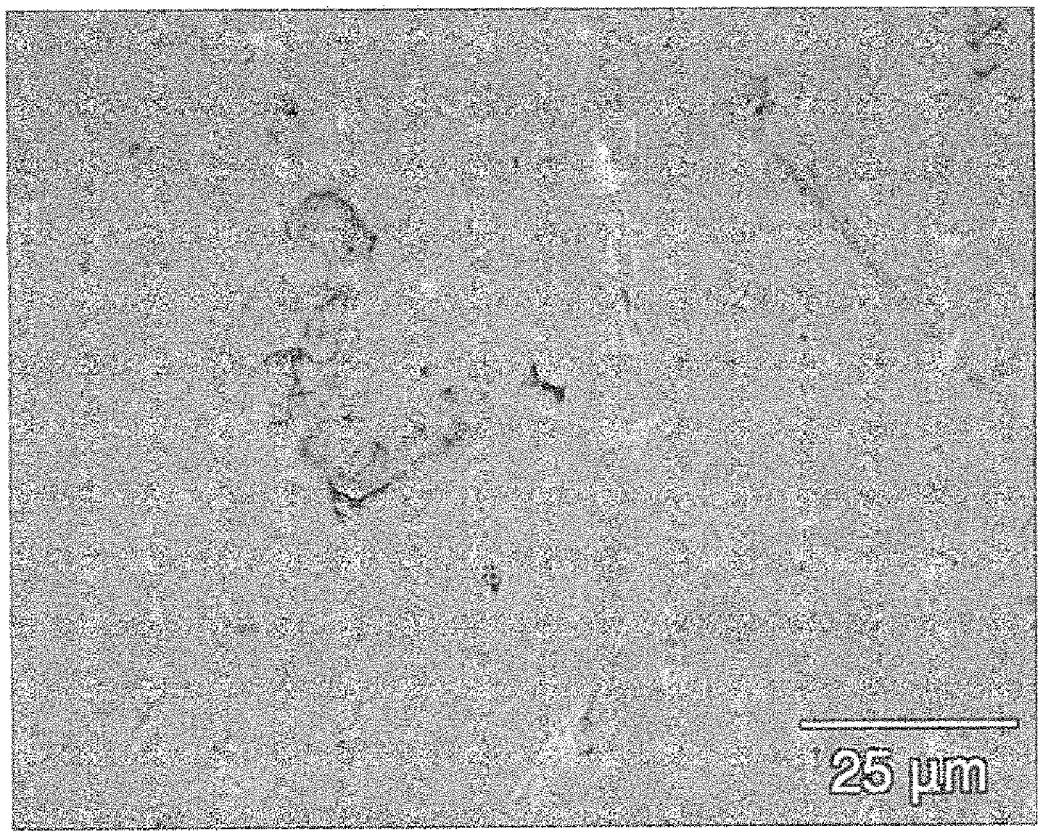
FIGS. 3a-3h are a series of photomicrographs showing backscattering electron images (BEI) for a series of alloys illustrative of the present invention.
Figure 3B:
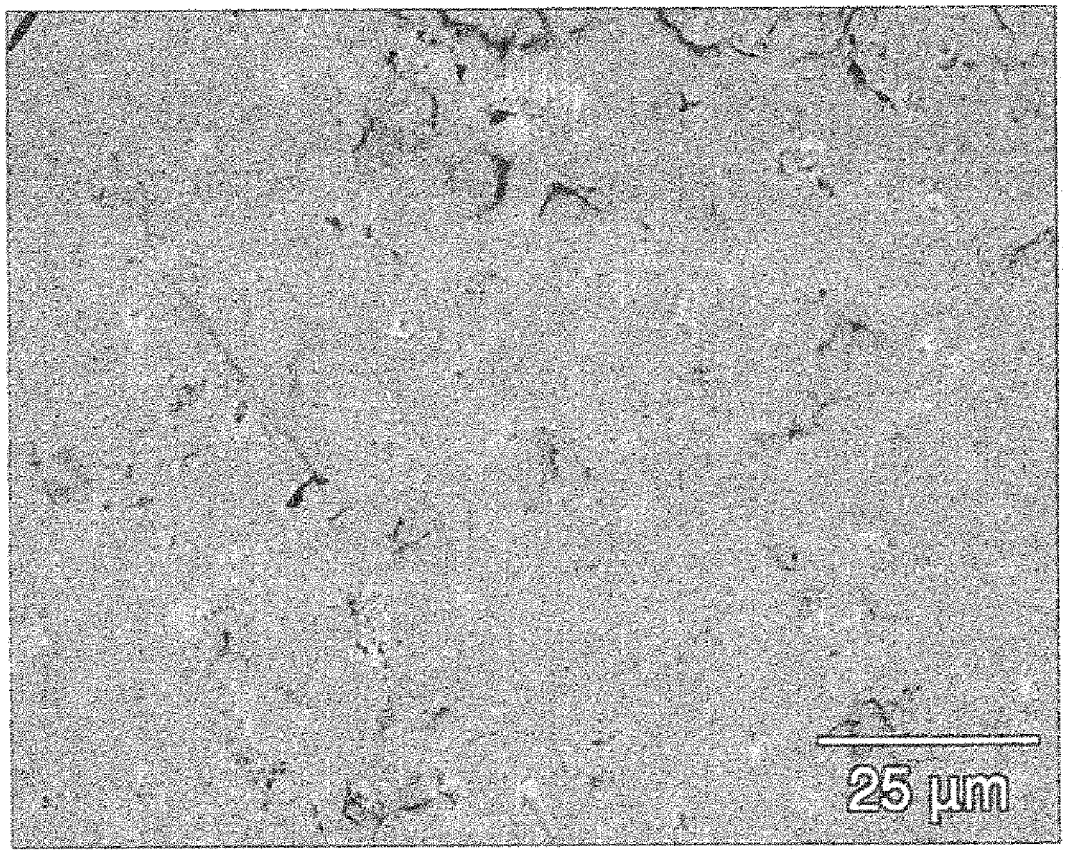
Figure 3C:
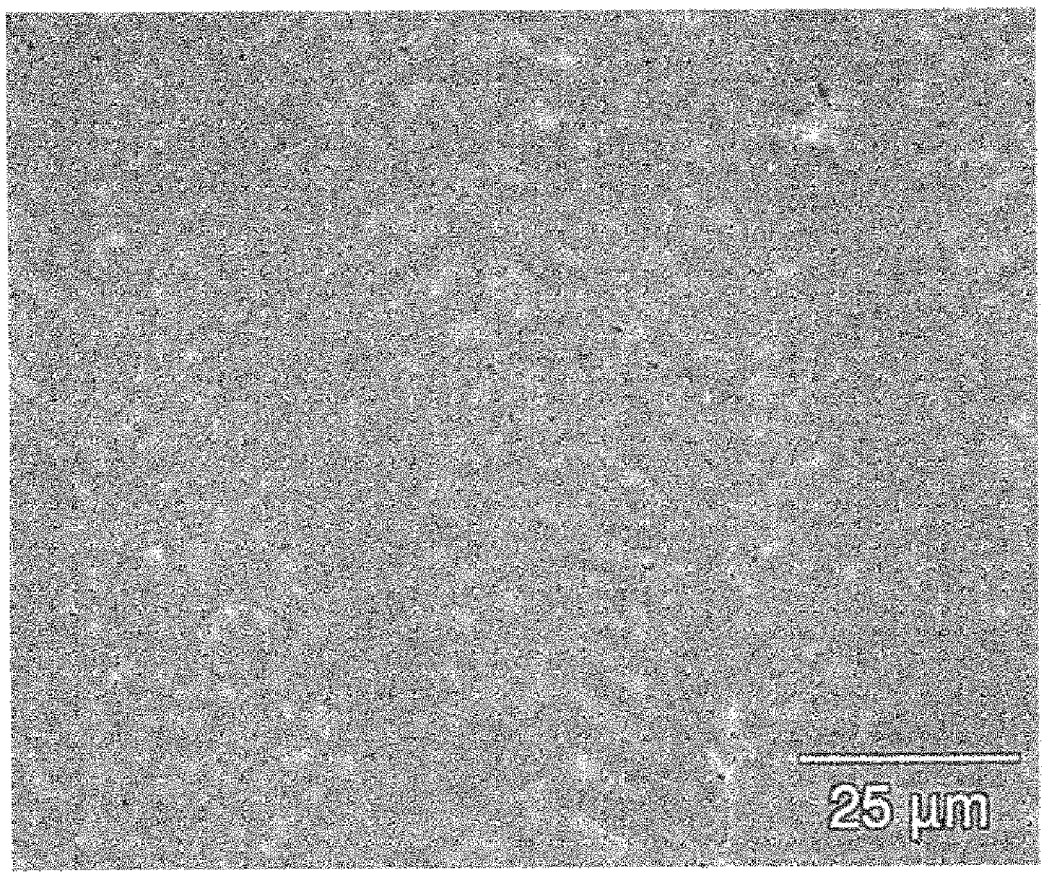
Figure 3D:
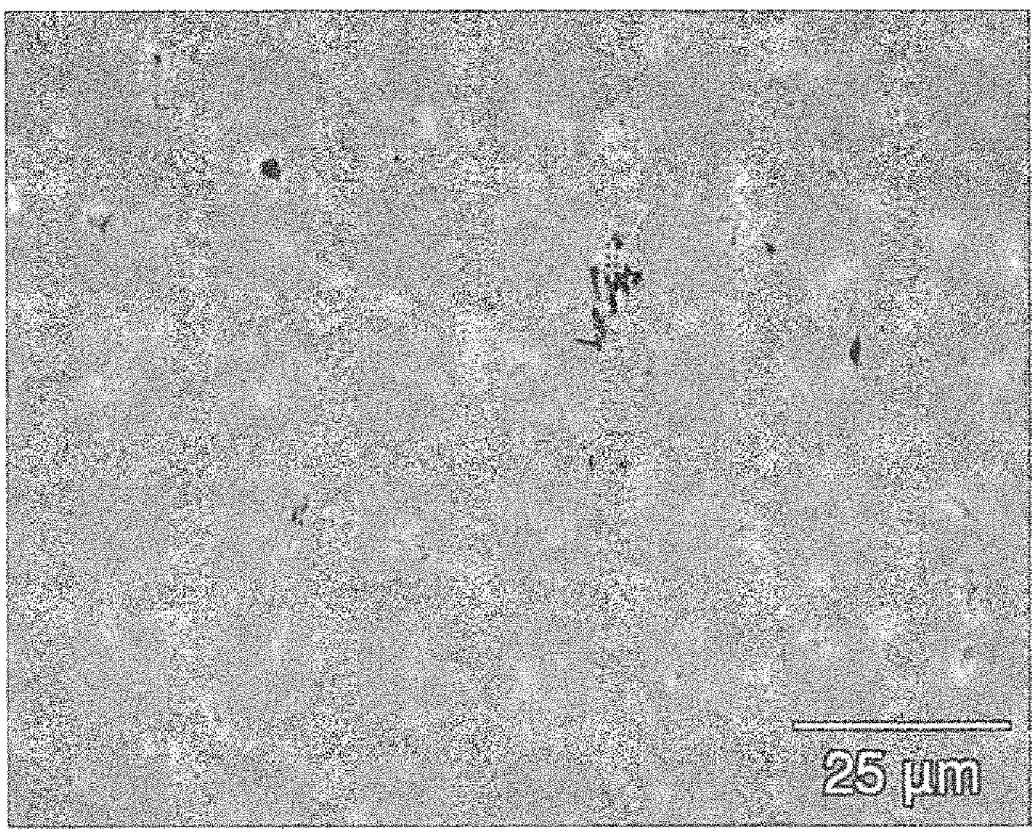
Figure 3E:
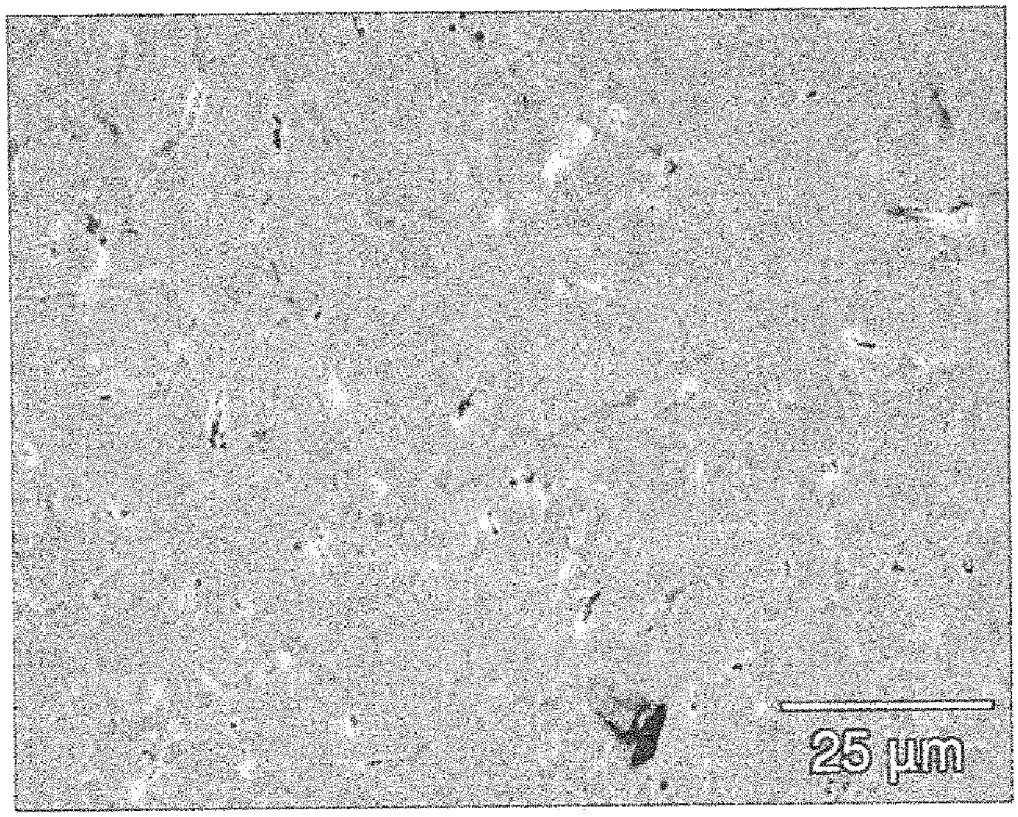
Figure 3F:
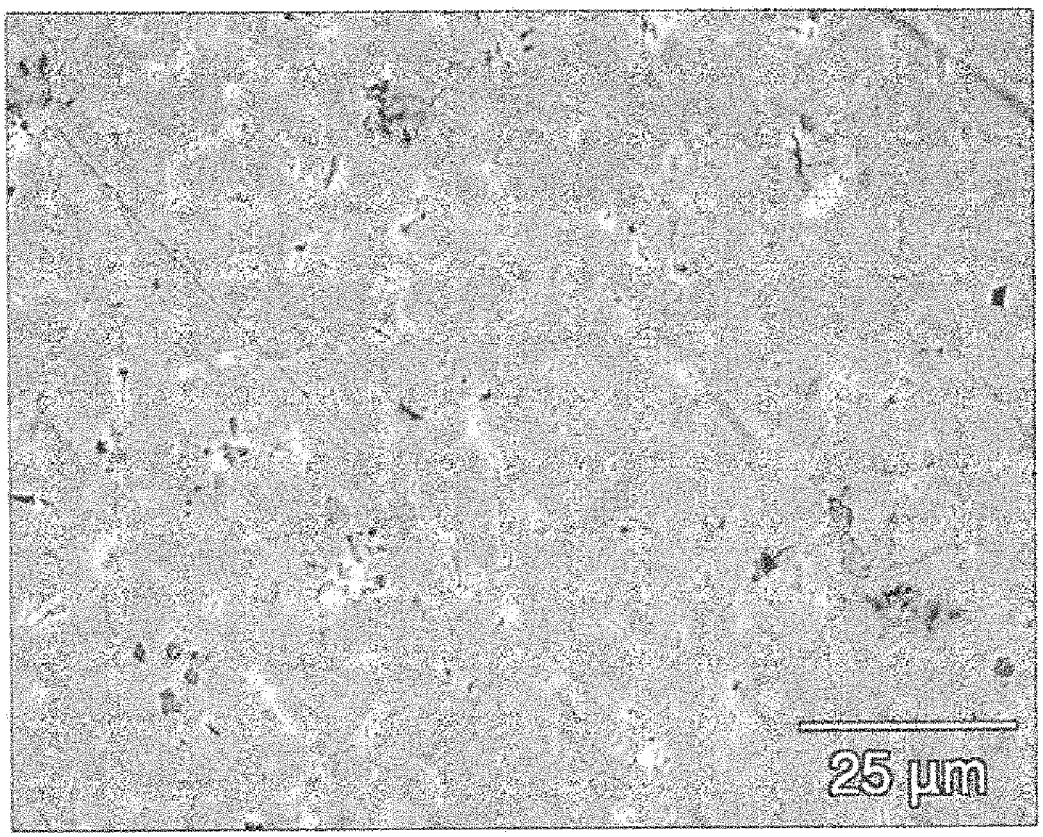
Figure 3G:
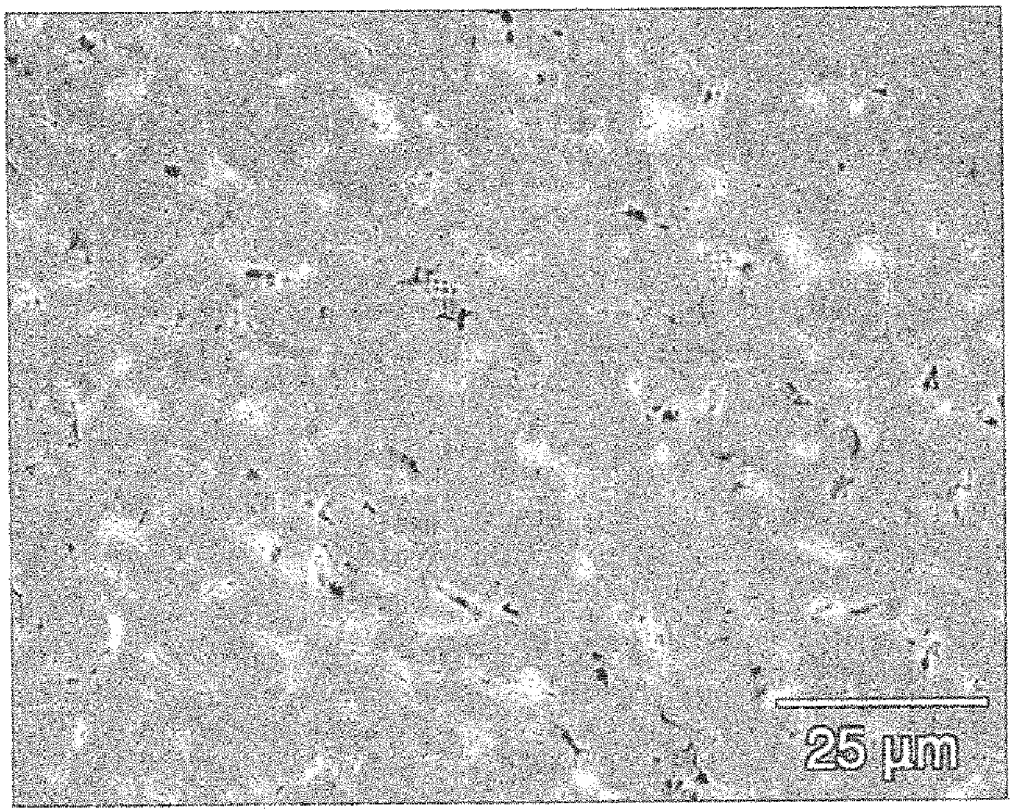

| Alloy number | Area | Ti | Zr | V | Cr | Mn | Co | Ni | Sn | Al | Y | B/A | e/a | Phase |
|---|---|---|---|---|---|---|---|---|---|---|---|---|---|---|
| 177 | 1 | 17.7 | 26.6 | 1.1 | 0.4 | 1.3 | 0.4 | 48.1 | 4.0 | 0.4 | 0.0 | 1.3 | 7.36 | $AB/Zr_7Ni_{10}$ |
|  | 2 | 23.5 | 21.0 | 1.2 | 0.4 | 1.7 | 0.6 | 50.5 | 0.7 | 0.4 | 0.0 | 1.2 | 7.20 | AB |
|  | 3 | 12.6 | 23.3 | 9.5 | 4.8 | 5.5 | 1.3 | 42.5 | 0.2 | 0.3 | 0.0 | 1.8 | 6.99 | $AB_2$ |
|  | 4 | 9.9 | 22.9 | 14.1 | 10.5 | 7.2 | 1.6 | 33.0 | 0.2 | 0.6 | 0.0 | 2.0 | 6.64 | $AB_2$ |
|  | 5 | 5.0 | 82.0 | 2.2 | 1.0 | 0.8 | 0.2 | 8.5 | 0.3 | 0.0 | 0.0 | 0.1 | 4.62 | $ZrO_2$ |
| 177Y1 | FIG. 3a-1 | 9.5 | 11.8 | 4.1 | 2.9 | 2.2 | 0.9 | 32.0 | 15.1 | 0.8 | 20.5 | 1.4 | 7.42 | Y, Sn-rich |
|  | FIG. 3a-2 | 11.9 | 20.8 | 11.0 | 8.7 | 4.8 | 1.6 | 40.2 | 0.2 | 0.5 | 0.3 | 2.0 | 6.93 | $AB_2$ |
|  | FIG. 3a-3 | 9.5 | 21.4 | 13.4 | 14.6 | 6.1 | 1.9 | 32.5 | 0.1 | 0.5 | 0.1 | 2.2 | 6.66 | $AB_2$ |
|  | FIG. 3a-4 | 11.4 | 20.7 | 11.7 | 9.4 | 5.4 | 1.7 | 39.0 | 0.2 | 0.5 | 0.1 | 2.1 | 6.91 | $AB_2$ |
|  | FIG. 3a-5 | 12.7 | 20.9 | 8.9 | 6.2 | 4.4 | 1.3 | 44.6 | 0.1 | 0.5 | 0.3 | 1.9 | 7.08 | $AB_2$ |
|  | FIG. 3a-6 | 11.0 | 20.8 | 12.2 | 10.9 | 5.5 | 1.8 | 37.1 | 0.1 | 0.6 | 0.1 | 2.1 | 6.83 | $AB_2$ |
|  | FIG. 3a-7 | 13.5 | 20.7 | 8.2 | 5.8 | 4.1 | 1.4 | 45.5 | 0.0 | 0.5 | 0.3 | 1.9 | 7.11 | $AB_2$ |
| 177Y2 | FIG. 3b-1 | 9.7 | 14.3 | 5.8 | 4.4 | 2.5 | 0.8 | 33.5 | 12.3 | 0.8 | 15.8 | 1.5 | 7.34 | Y, Sn-rich |
|  | FIG. 3b-2 | 13.8 | 20.3 | 8.4 | 5.9 | 3.8 | 1.4 | 45.3 | 0.1 | 0.5 | 0.5 | 1.9 | 7.10 | $AB_2$ |
|  | FIG. 3b-3 | 11.5 | 17.1 | 7.7 | 5.7 | 3.5 | 1.1 | 42.8 | 3.8 | 0.6 | 6.3 | 1.9 | 7.23 | mixture |
|  | FIG. 3b-4 | 12.6 | 20.2 | 11.1 | 8.1 | 4.7 | 1.7 | 40.8 | 0.0 | 0.5 | 0.2 | 2.0 | 6.94 | $AB_2$ |
|  | FIG. 3b-5 | 13.1 | 19.8 | 8.0 | 5.6 | 4.0 | 1.3 | 46.1 | 0.5 | 0.5 | 1.5 | 1.9 | 7.13 | $AB_2$-2 |
|  | FIG. 3b-6 | 11.4 | 20.4 | 13.1 | 10.6 | 5.1 | 1.7 | 37.0 | 0.1 | 0.5 | 0.1 | 2.1 | 6.81 | $AB_2$ |
|  | FIG. 3b-7 | 12.4 | 20.7 | 8.9 | 6.6 | 4.0 | 1.5 | 44.8 | 0.0 | 0.6 | 0.5 | 2.0 | 7.09 | $AB_2$ |
| 177Y3 | FIG. 3c-1 | 12.0 | 21.9 | 10.0 | 6.5 | 5.6 | 2.1 | 40.9 | 0.1 | 0.6 | 0.3 | 1.9 | 6.96 | $AB_2$ |
|  | FIG. 3c-2 | 13.8 | 25.9 | 0.8 | 0.2 | 0.8 | 0.7 | 56.6 | 0.0 | 0.3 | 1.0 | 1.5 | 7.46 | $Zr_7Ni_{10}$ |
|  | FIG. 3c-3 | 20.6 | 17.9 | 1.3 | 0.7 | 2.1 | 1.4 | 51.2 | 0.1 | 0.7 | 4.0 | 1.4 | 7.20 | AB |
|  | FIG. 3c-4 | 11.3 | 17.0 | 5.9 | 4.1 | 3.0 | 1.0 | 47.5 | 0.2 | 0.5 | 9.4 | 1.6 | 7.05 | $AB/AB_2$-2 |
|  | FIG. 3c-5 | 11.6 | 19.9 | 11.0 | 8.0 | 6.1 | 2.5 | 40.1 | 0.1 | 0.6 | 0.2 | 2.2 | 6.99 | $AB_2$ |
|  | FIG. 3c-6 | 5.9 | 8.4 | 29.1 | 29.0 | 5.5 | 1.3 | 20.1 | 0.1 | 0.2 | 0.2 | 5.9 | 6.31 | BCC |
| 177Y4 | FIG. 3d-1 | 4.0 | 5.5 | 2.0 | 1.6 | 1.0 | 0.5 | 14.2 | 35.4 | 0.4 | 35.3 | 1.2 | 8.14 | Y, Sn-rich |
|  | FIG. 3d-2 | 6.0 | 8.7 | 2.3 | 1.7 | 1.4 | 0.5 | 53.2 | 0.5 | 0.7 | 24.5 | 1.5 | 7.09 | AB |
|  | FIG. 3d-3 | 9.7 | 12.7 | 4.4 | 3.5 | 2.4 | 0.8 | 50.4 | 0.2 | 0.9 | 15.1 | 1.7 | 7.11 | AB |
|  | FIG. 3d-4 | 11.4 | 17.5 | 9.0 | 7.4 | 4.0 | 1.4 | 44.4 | 0.1 | 0.7 | 4.0 | 2.0 | 7.05 | $AB_2$-2 |
|  | FIG. 3d-5 | 13.0 | 18.7 | 11.5 | 8.8 | 4.4 | 1.6 | 40.8 | 0.0 | 0.5 | 0.6 | 2.1 | 6.94 | $AB_2$ |
|  | FIG. 3d-6 | 11.3 | 12.1 | 6.1 | 4.5 | 3.2 | 1.1 | 36.2 | 0.0 | 0.4 | 25.2 | 1.1 | 6.22 | $Y_2O_3$ |
|  | FIG. 3d-7 | 10.9 | 7.3 | 2.7 | 1.9 | 1.6 | 0.4 | 61.1 | 0.3 | 0.7 | 13.1 | 2.2 | 7.69 | $Y_2O_3$ |
| 193 | 1 | 17.5 | 25.1 | 1.5 | 0.4 | 1.2 | 2.5 | 50.7 | 0.9 | 0.2 | 0.0 | 1.2 | 7.30 | $Zr_7Ni_{10}$ |
|  | 2 | 11.6 | 22.3 | 12.2 | 7.6 | 5.8 | 5.4 | 34.6 | 0.1 | 0.4 | 0.0 | 1.9 | 6.80 | $AB_2$ |
|  | 3 | 20.1 | 20.9 | 3.7 | 1.5 | 2.5 | 3.4 | 47.2 | 0.4 | 0.3 | 0.0 | 1.4 | 7.18 | AB |
|  | 4 | 6.0 | 72.0 | 3.1 | 1.3 | 1.4 | 1.3 | 14.4 | 0.3 | 0.3 | 0.0 | 0.3 | 5.06 | $ZrO_2$ |
| 193Y1 | FIG. 3e-1 | 18.6 | 15.4 | 3.2 | 0.8 | 1.6 | 4.4 | 46.3 | 2.3 | 0.5 | 6.9 | 1.4 | 7.25 | $Zr_7Ni_{10}$ |
|  | FIG. 3e-2 | 24.1 | 17.1 | 2.1 | 0.5 | 1.3 | 5.0 | 48.6 | 0.0 | 0.5 | 0.7 | 1.4 | 7.22 | $Zr_7Ni_{10}$ |
|  | FIG. 3e-3 | 10.5 | 21.1 | 12.5 | 4.5 | 3.9 | 9.3 | 37.4 | 0.2 | 0.4 | 0.1 | 2.2 | 7.05 | $AB_2$ |
|  | FIG. 3e-4 | 11.7 | 21.0 | 10.2 | 3.3 | 3.3 | 8.2 | 41.1 | 0.1 | 0.5 | 0.3 | 2.0 | 7.13 | $AB_2$ |
|  | FIG. 3e-5 | 21.6 | 17.0 | 2.8 | 0.6 | 1.5 | 4.9 | 48.9 | 0.3 | 0.5 | 1.7 | 1.5 | 7.26 | $Zr_7Ni_{10}$ |
|  | FIG. 3e-6 | 20.1 | 12.1 | 2.4 | 0.5 | 1.3 | 4.1 | 38.7 | 16.9 | 0.4 | 3.4 | 1.8 | 8.25 | $SnO_2$ |
| 193Y2 | FIG. 3f-1 | 8.5 | 12.0 | 6.4 | 2.0 | 2.0 | 5.1 | 29.5 | 18.8 | 0.5 | 15.3 | 1.8 | 7.92 | Y, Sn-rich |
|  | FIG. 3f-2 | 16.4 | 17.8 | 5.6 | 1.7 | 2.2 | 5.6 | 47.7 | 0.1 | 0.6 | 2.2 | 1.7 | 7.28 | $AB/AB_2$ |
|  | FIG. 3f-3 | 12.2 | 20.0 | 9.1 | 3.1 | 2.9 | 7.5 | 43.1 | 0.1 | 0.7 | 1.4 | 2.0 | 7.19 | $AB_2$-2 |
|  | FIG. 3f-4 | 12.6 | 19.8 | 10.4 | 3.8 | 3.2 | 8.4 | 40.7 | 0.0 | 0.5 | 0.5 | 2.0 | 7.12 | $AB_2$ |
|  | FIG. 3f-5 | 12.1 | 19.9 | 8.9 | 3.0 | 2.8 | 7.6 | 43.6 | 0.1 | 0.5 | 1.5 | 2.0 | 7.22 | $AB_2$-2 |
|  | FIG. 3f-6 | 10.8 | 21.0 | 11.2 | 3.5 | 3.3 | 8.8 | 40.3 | 0.2 | 0.4 | 0.4 | 2.1 | 7.15 | $AB_2$ |
| 193Y3 | FIG. 3g-1 | 11.5 | 16.8 | 7.3 | 2.4 | 2.7 | 5.9 | 45.6 | 0.8 | 0.6 | 6.4 | 1.9 | 7.24 | $AB_2$-2 |
|  | FIG. 3g-2 | 12.1 | 19.5 | 12.1 | 4.1 | 3.6 | 9.2 | 38.2 | 0.1 | 0.5 | 0.6 | 2.1 | 7.06 | $AB_2$ |
|  | FIG. 3g-3 | 11.6 | 19.6 | 11.4 | 4.0 | 3.7 | 8.9 | 39.2 | 0.3 | 0.4 | 0.8 | 2.1 | 7.12 | $AB_2$ |
|  | FIG. 3g-4 | 12.4 | 22.6 | 10.4 | 3.3 | 3.3 | 8.0 | 38.6 | 0.1 | 0.5 | 0.7 | 1.8 | 6.98 | $AB_2$ |
|  | FIG. 3g-5 | 18.8 | 15.0 | 4.9 | 1.5 | 2.4 | 5.7 | 47.3 | 0.2 | 0.5 | 3.5 | 1.7 | 7.25 | $AB/AB_2$ |

TABLE 3-continued

EDS results in at. % from areas identified in SEM micrographs (FIG. 3).

Figure 3H:
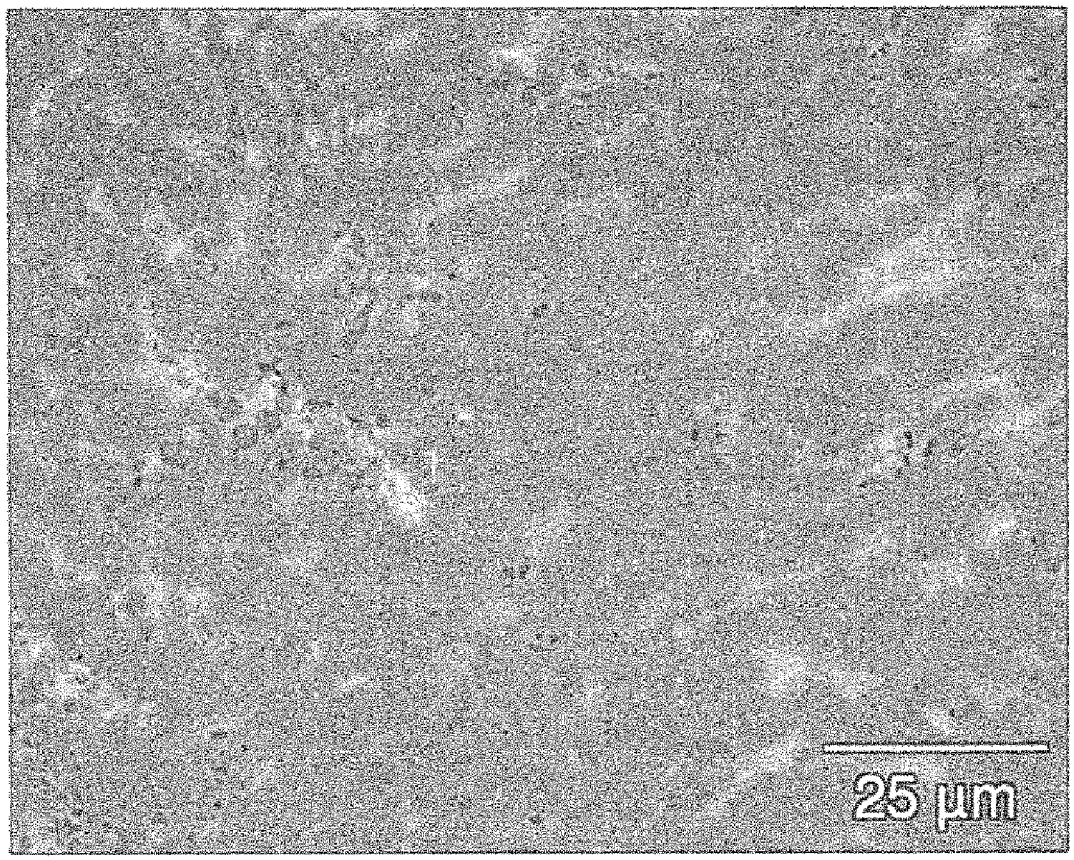

| Alloy number | Area | Ti | Zr | V | Cr | Mn | Co | Ni | Sn | Al | Y | B/A | e/a | Phase |
|---|---|---|---|---|---|---|---|---|---|---|---|---|---|---|
| 193Y4 | FIG. 3h-1 | 11.0 | 17.7 | 6.1 | 1.6 | 2.6 | 5.4 | 48.6 | 0.6 | 0.8 | 5.6 | 1.9 | 7.35 | $AB_2$-2 |
| | FIG. 3h-2 | 9.5 | 14.4 | 3.6 | 1.0 | 2.3 | 3.3 | 54.3 | 0.1 | 1.1 | 10.6 | 1.9 | 7.45 | $AB_2$-2 |
| | FIG. 3h-3 | 5.5 | 8.7 | 2.3 | 0.7 | 1.5 | 2.3 | 52.5 | 0.2 | 0.9 | 25.3 | 1.5 | 7.10 | AB |
| | FIG. 3h-4 | 12.4 | 19.0 | 10.2 | 3.3 | 2.8 | 8.3 | 42.3 | 0.0 | 0.6 | 1.1 | 2.1 | 7.19 | $AB_2$ |
| | FIG. 3h-5 | 25.6 | 11.1 | 1.4 | 0.2 | 1.3 | 4.5 | 49.1 | 0.1 | 0.9 | 5.7 | 1.4 | 7.17 | $AB/AB_2$ |
| | FIG. 3h-6 | 11.6 | 19.7 | 11.4 | 3.6 | 3.2 | 9.0 | 40.3 | 0.0 | 0.5 | 0.6 | 2.1 | 7.14 | $AB_2$ |
| | FIG. 3h-7 | 12.7 | 18.9 | 10.7 | 3.3 | 3.1 | 8.5 | 41.5 | 0.0 | 0.6 | 0.7 | 2.1 | 7.17 | $AB_2$ |
| | FIG. 3h-8 | 5.8 | 6.2 | 2.7 | 1.0 | 1.2 | 2.3 | 25.4 | 0.1 | 0.8 | 54.6 | 0.5 | 5.18 | $Y_2O_3$ |

Besides the main $AB_2$ phase (which contained a very small amount of Y), there was another $AB_2$ phase (denoted as $AB_2$-2 in Table 3) with higher Y-content and relatively low V- and Cr-contents found in alloys with designed Y-levels higher than 1 at. %. The phase showing the brightest contrast was very rich in both Sn and Y (a-1, b-1, d-1, and f-1). The corresponding XRD peaks were difficult to be identified due to its low abundance and overlap with many XRD peaks in the $Y_{11}Sn_9$ and $Y_5Sn_4$ phases from the Sn—Y phase diagram that happened to be close to the compositions identified by EDS. The AB phase could be either TiNi (in the Y-free alloys) or YNi (in the Y-doped alloys). Occasionally, metal oxide inclusions, such as $ZrO_2$, $SnO_2$, and $Y_2O_3$, were also found in the alloys.

The phase abundances analyzed by Jade 9 software have been listed in Table 2. In both series, the addition of Y increased the C15 phase abundance. The microstructure of the 177-series changed from being C14-predominant to a mixture of C14:C15≈2:3 while that of the 193-series remained C15-predominant with Y-addition. The increase in C15 phase abundance was related to the chemical composition of the main phase. Regarding the secondary phases, small amounts of $Zr_7Ni_{10}$ and YNi phases were found in the 177-series of alloys with relatively higher Y-contents (≥2 at. % Y). Also, TiNi, the main secondary phase found in the base alloy of the 177-series, appeared in the 193-series of alloys with zero or low Y-content. Lastly, very small amounts of $Y_2O_3$ phase (<1%) were seen in few of the alloys.

The gaseous phase hydrogen storage properties of the alloys were studied by PCT. The resulting absorption and desorption isotherms measured at 30 and 60° C. have been displayed in FIGS. 5a-d. The information obtained from the PCT study has been summarized in Table 4.

Figure 4A:
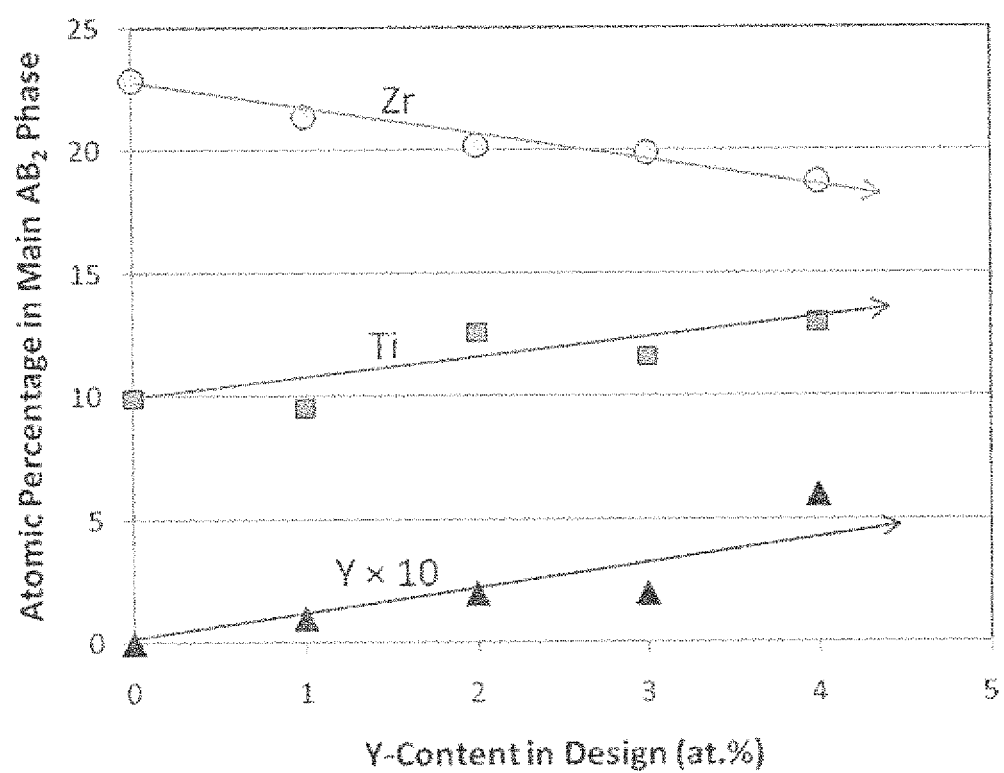
FIGS. 4a and 4b are graphs depicting compositions of alloys illustrative of the present invention as functions of their modifier element concentration.
Figure 4B:
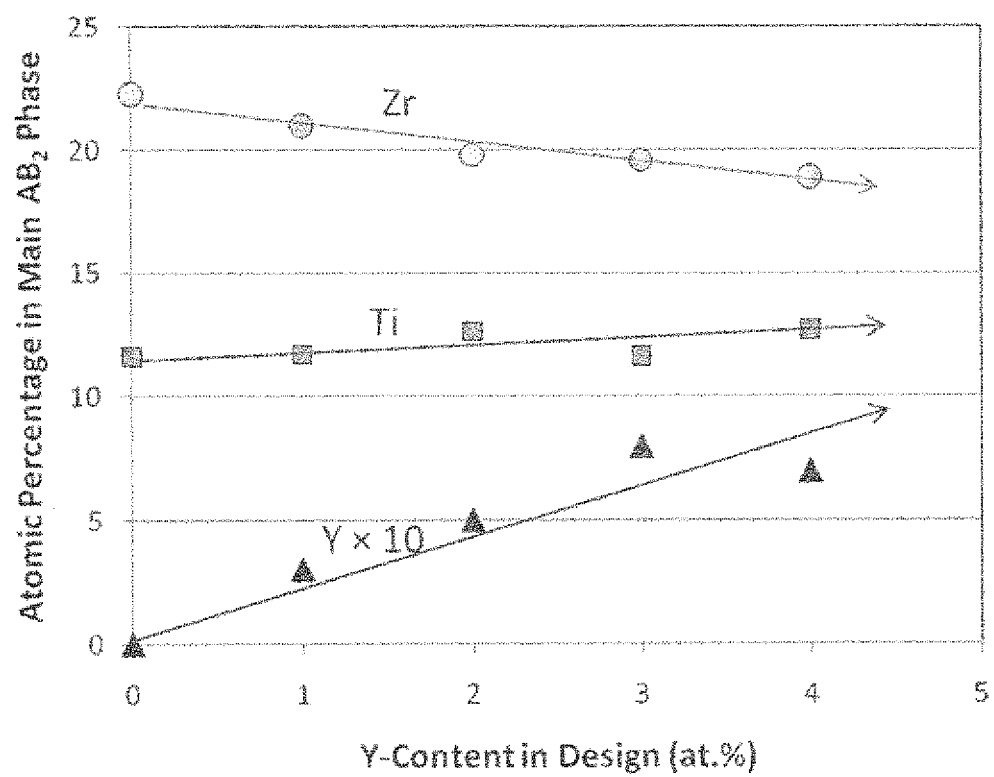
Figure 5A:
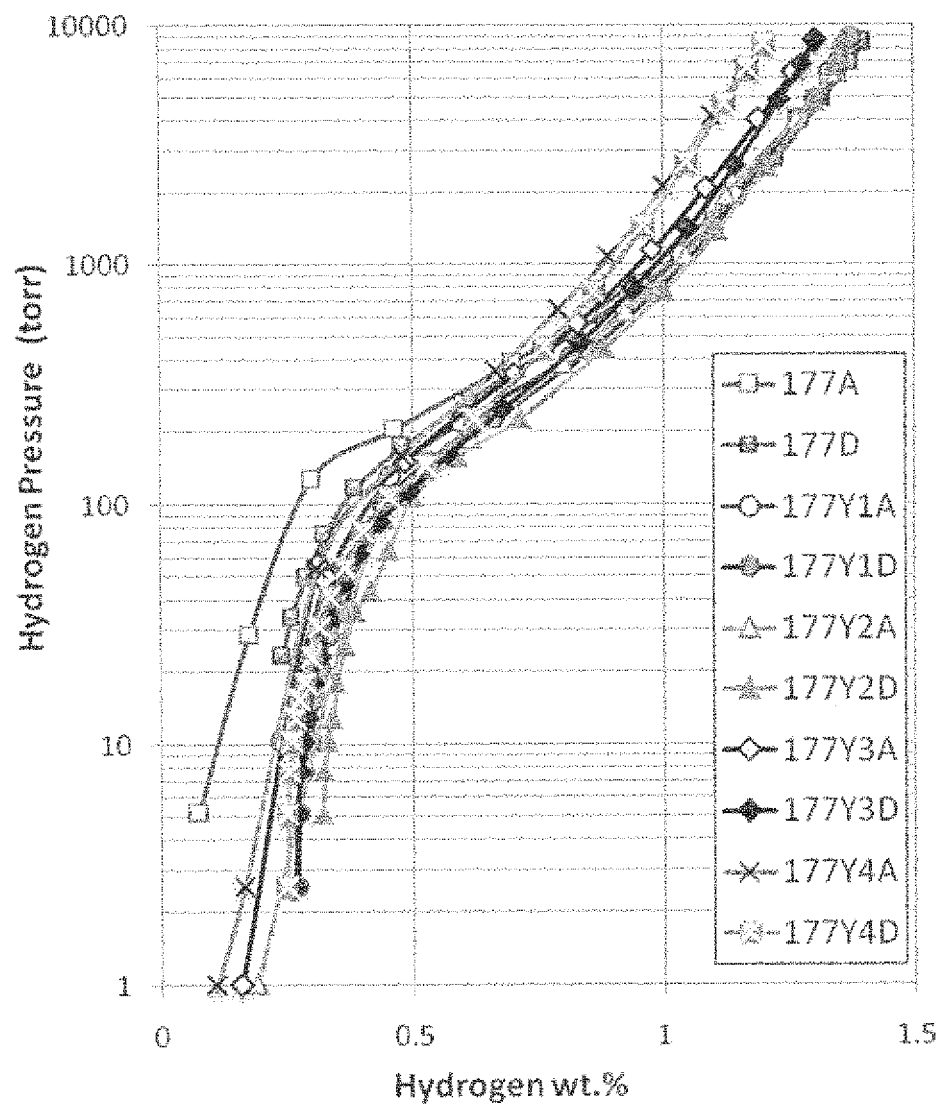
FIGS. 5a-5d depict hydrogen storage isotherms for a series of alloys illustrative of the present invention.
Figure 5B:
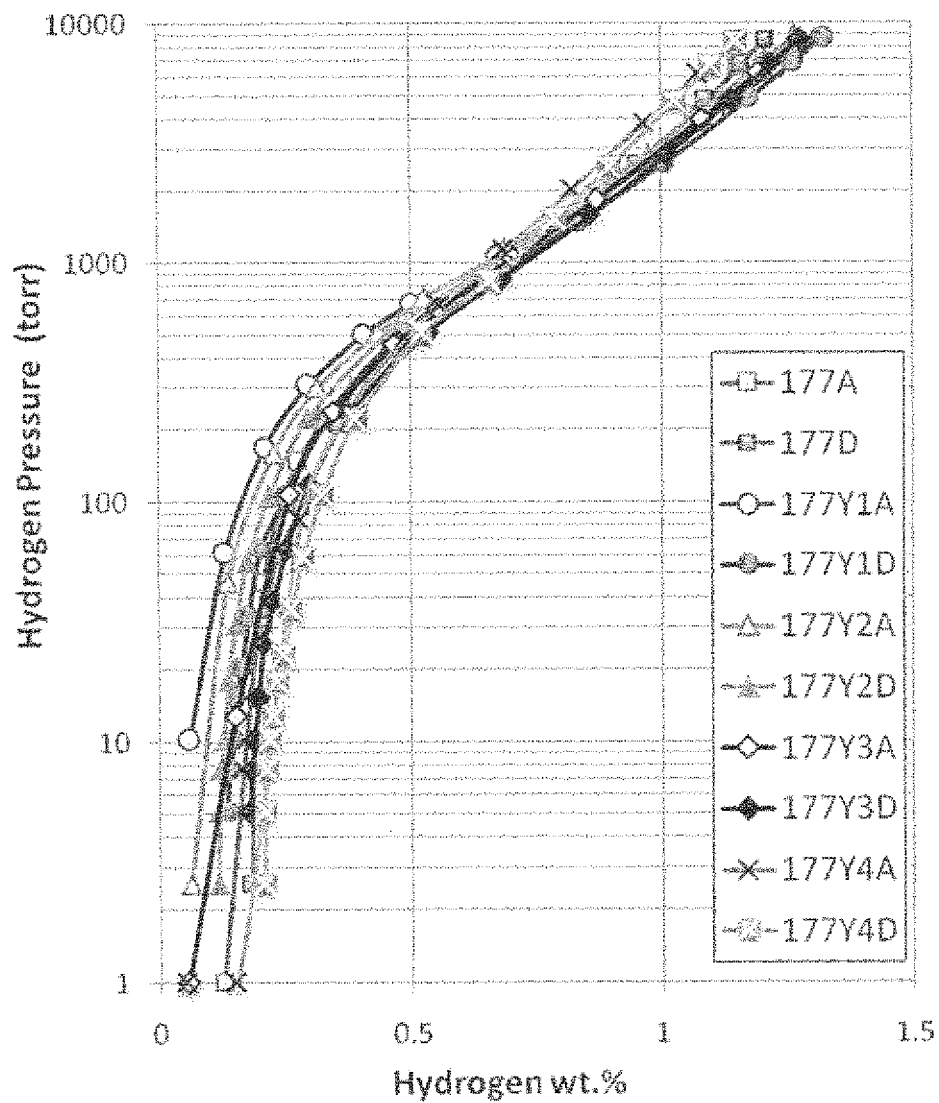
Figure 5C:
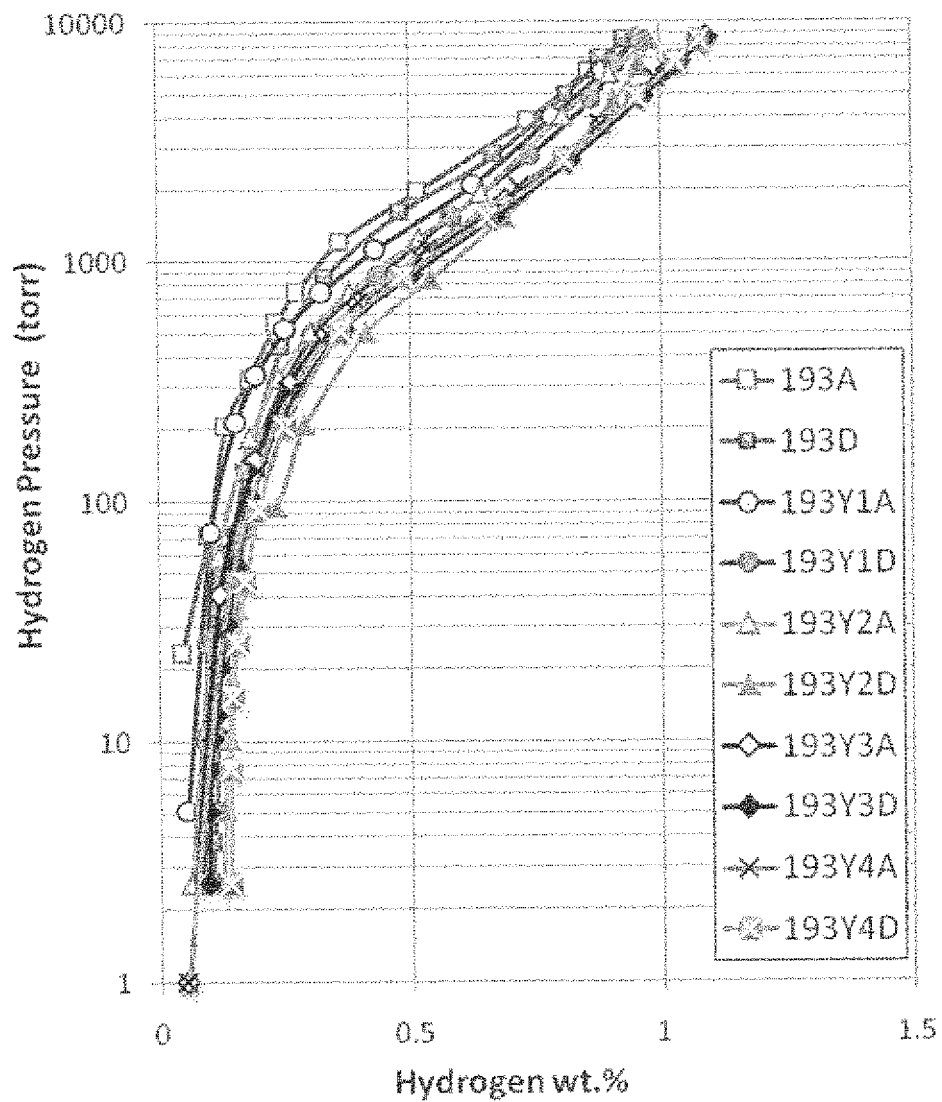
Figure 5D:
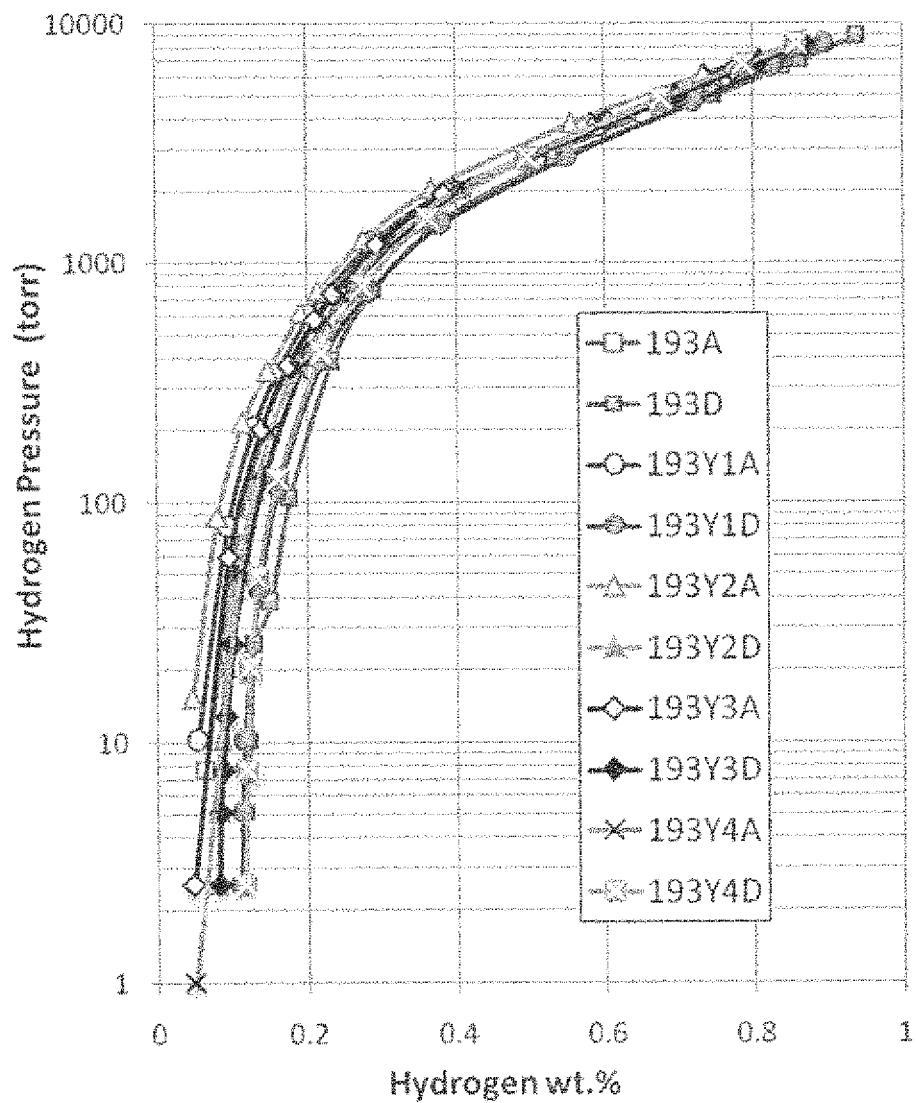
Figure 6A:
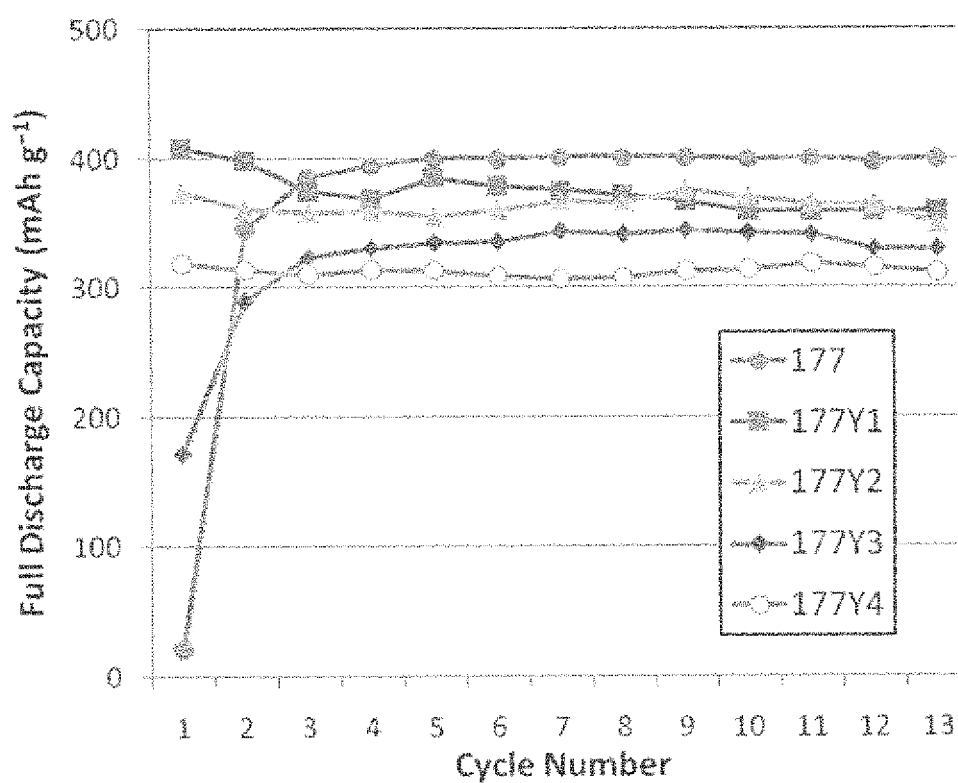
FIGS. 6a and 6b are graphs depicting full discharge capacity versus cycle number for a series of metal hydride batteries incorporating alloys illustrative of the present invention.
Figure 6B:
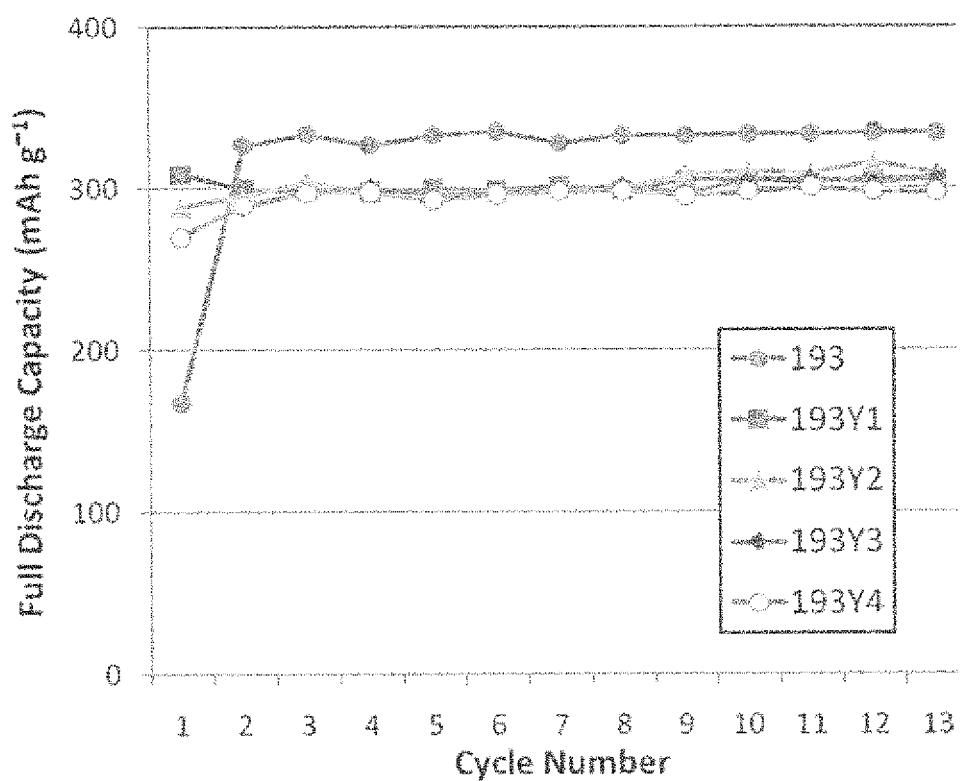
Figure 6C:
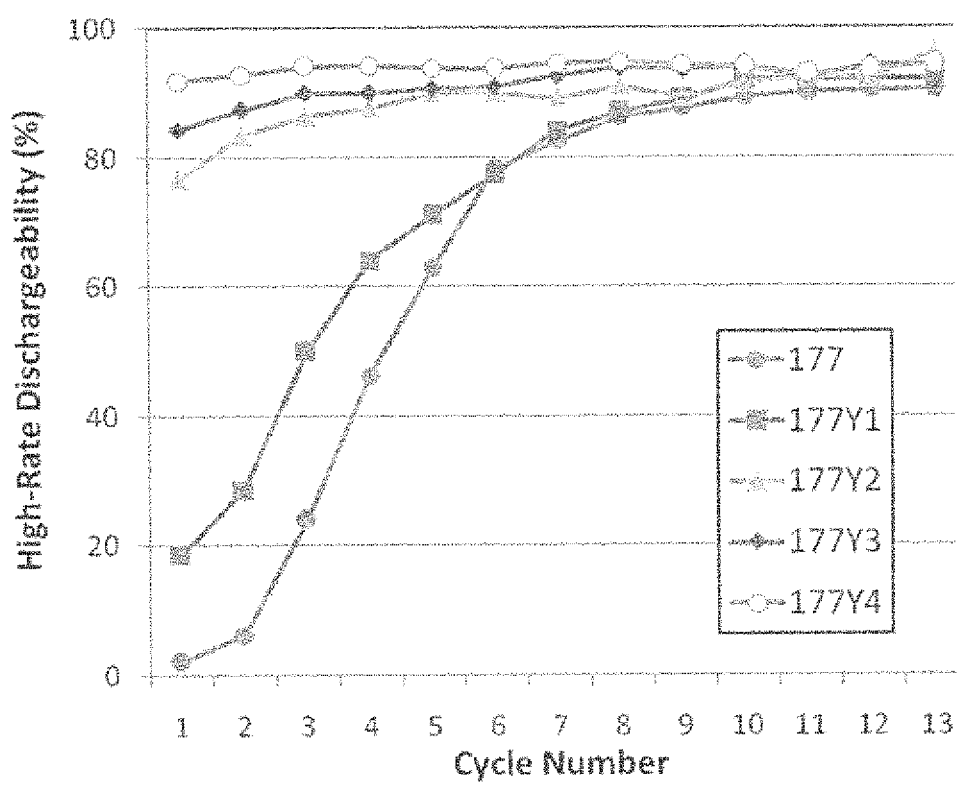
FIGS. 6c and 6d are graphs depicting the full discharge capacity as a function of cycle number for a series of metal hydride batteries incorporating alloys illustrative of the present invention.
Figure 6D:
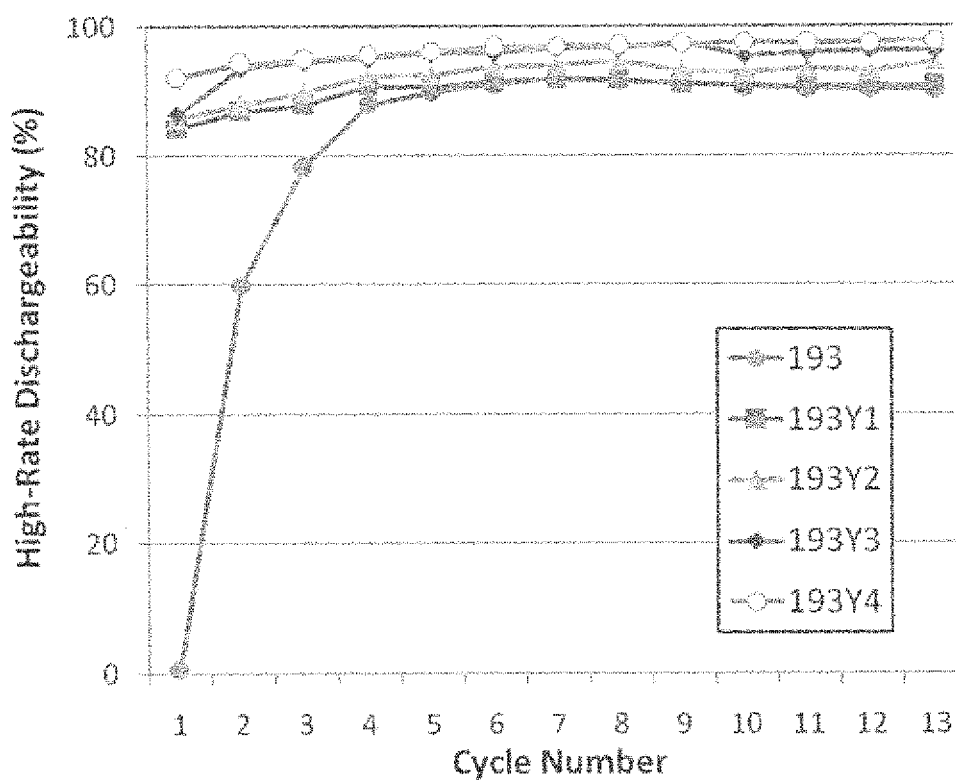
Figure 7:
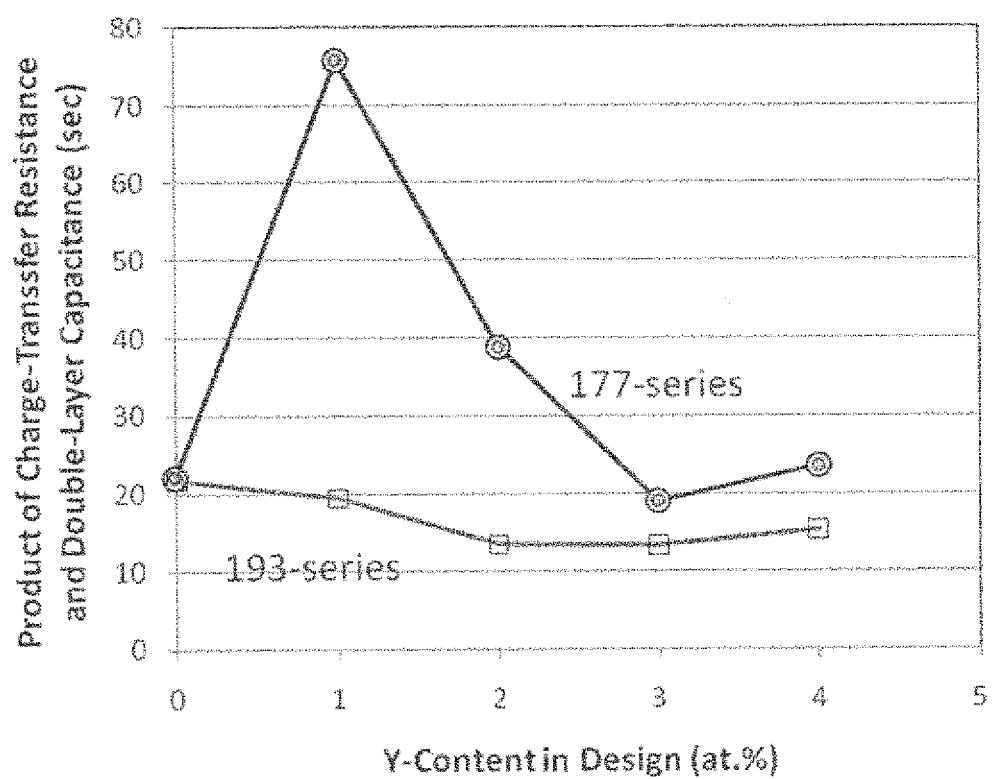
FIG. 7 is a graph depicting the product of charge transfer resistance and double layer capacitance as a function of modifier concentration for alloys illustrative of the present invention.

Due to the high plateau pressures of these two series of alloys, only the 30° C. PCT of the 177-series showed a complete α (metal)-to-β (hydride) transition while the end-points of the plateau regions in the other three sets of isotherms were above the available maximum hydrogen pressure in the PCT apparatus (8500 torr). In the 177-series of alloys, both the maximum and the reversible hydrogen storage capacities decreased as the Y-content increased. These decreases were due to the unit cell shrinkage found in XRD that could be attributed to the decreasing Zr-contents in the main phases (FIG. 4a). In the 193-series, both the maximum and the reversible hydrogen storage capacities measured at 30° C. increased and later decreased as the Y-content increased. This finding differed from what was predicted by the unit cell shrinkage but can be explained by the incompleteness of the PCT isotherm caused by the high plateau pressure. For the same reason, the increase in hydrogen storage capacity with increasing Y-content was not observed in the 60° C. isotherms (FIG. 5d). For both series, the 30° C. mid-points of the desorption isotherms of the Y-doped alloys were lower than that of the Y-free base alloy. This finding was interesting because the smaller unit cells found in the Y-doped alloys have usually been associated with less stable hydrides with higher plateau pressures. Intersections in a series of PCT isotherms, as in FIG. 5a, with one controlling factor have seldom been seen. In addition, calculations of the heat of hydride formation for the alloys (based on the atomic percentages and corresponding heats of hydride formation of the constituent elements in the main phase) showed that the Y-doped alloys had higher (less negative value) heats of hydride formation than the Y-free base alloy did in both series, which supported the argument that the metal-hydrogen bond strength decreases with the addition of Y.

TABLE 4

Summary of gaseous phase hydrogen storage properties of alloys in this study.

| Alloy number | Max. H-storage at 30° C. (wt. %) | Max. H-storage at 60° C. (wt. %) | Rev. H-storage at 30° C. (wt. %) | Mid-point pressure at 30° C. Desorption (torr) | 30° C. PCT hysteresis | 30° C. PCT slope factor |
|---|---|---|---|---|---|---|
| 177 | 1.40 | 1.21 | 1.16 | 502 | 0.11 | 0.79 |
| 177Y1 | 1.38 | 1.32 | 1.11 | 410 | 0.17 | 0.77 |
| 177Y2 | 1.36 | 1.27 | 1.04 | 391 | 0.16 | 0.77 |
| 177Y3 | 1.31 | 1.28 | 1.04 | 404 | 0.20 | 0.75 |
| 177Y4 | 1.20 | 1.15 | 0.95 | 386 | 0.24 | 0.73 |
| 193 | 0.93 | 0.93 | 0.83 | 1820 | 0.07 | 0.74 |
| 193Y1 | 0.96 | 0.90 | 0.88 | 1234 | 0.34* | 0.69 |
| 193Y2 | 0.98 | 0.85 | 0.85 | 900 | 0.46* | 0.70 |
| 193Y3 | 1.10 | 0.87 | 1.00 | 1246 | 0.11 | 0.66 |
| 193Y4 | 1.08 | 0.86 | 0.94 | 1333 | 0.11 | 0.65 |

*denotes large hysteresis due to the presence of dual phases.

The hysteresis of the PCT isotherm, listed in Table 4, has conventionally been defined as $\ln(P_a/P_d)$, where $P_a$ and $P_d$ are the absorption and desorption mid-point pressures, respectively. The amount of hysteresis is positively correlated with (and thus can be used to predict) the pulverization rate of the alloy during cycling. In the current study, the Y-doped alloys had slightly larger hystereses and therefore higher pulverization rates during hydride/dehydride cycling were expected with the addition of Y.

The slope factor (SF) has conventionally been defined as the ratio of the storage capacity between 76 and 3800 torr to the total capacity and can be related to the degree of disorder in the alloy. In the current study, the SF value did not change by much with Y-addition since only a small amount of Y was incorporated into the main phase, which suggested that Y-addition did not change the degree of disorder in the alloy.

The discharge capacity of each alloy was measured in a flooded-cell configuration against a partially pre-charged $Ni(OH)_2$ positive electrode. No alkaline pretreatment was applied before the half-cell measurement. Each sample electrode was charged at a constant current density of 50 mA g$^{-1}$ for 10 h and then discharged at a current density of 50 mA g$^{-1}$ followed by two pulls at 12 and 4 mA g$^{-1}$. The obtained full capacities (4 mA g$^{-1}$) from the first 13 cycles have been plotted in FIGS. 6a and 6b for the 177- and 193-series of alloys, respectively. While the Y-free base alloys needed one or two cycles to reach the stabilized full capacities, almost all of the Y-doped alloys reached the same status in the first cycle, demonstrating a faster activation. In the 177-series, the full capacity decreased with increase in Y-content, which was consistent with the decrease in gaseous phase hydrogen storage capacity found from PCT measurements and the shrinking unit cell volume found in XRD analysis. In the 193-series, the full capacities of the Y-containing alloys were similar and lower than that of the Y-free base alloy. This finding was consistent with the XRD result (smaller unit cell), but it was different from the gaseous phase hydrogen storage capacity measured at 30° C. HRD, defined as the ratio of capacities measured at discharge current densities of 50 mA g$^{-1}$ and 4 mA g$^{-1}$, in the first 13 cycles have been plotted in FIGS. 6c and 6d for 177- and 193-series of alloys, respectively. In both series of alloys, as the Y-content in the alloy increased, the HRD stabilized more quickly and reached a higher value. The full capacity and the HRD value at cycle 10 have been listed in Table 5.

In the 177-series, the HRD value increased with the increase in Y-content alloys due to the catalytic contribution from the Y-containing secondary phases. In the 193-series of alloys, the HRD value increased more dramatically with the increase in Y-content for the same reason as in the 177-series. The cycle number at which the HRD reaches 90% can be used to evaluate the activation behavior and has been listed in Table 5 for each alloy. In both series, the number of activation cycles decreased with the increase in Y-content. Both the Y-containing secondary phase and the increase in C15-abundance contributed to an easier activation. To summarize the electrochemical results obtained thus far, the partial substitution of Zr by Y facilitated activation and increased HRD, but it reduced the full capacity in both series of alloys.

In order to further understand the source of the increase in HRD with the increase in Y-content, both the bulk diffusion coefficient (D) and the surface exchange current ($I_o$) were measured, and the values have been listed in Table 5. In the 177-series of alloys, the increase in HRD was mainly due to the better bulk diffusion from the higher C15 phase abundance. In the 193-series of alloys, the increase in HRD came from the combination of increased bulk diffusion and surface reaction.

The low-temperature characteristics were studied with an AC impedance measurement conducted at −40° C. Pressed electrodes were activated in 30% KOH at 100° C. for 4 h before the measurement. The charge-transfer resistance (R), double-layer capacitance (C), and the RC product of each alloy were calculated from the Cole-Cole plot and have been listed in Table 5. In the 177-series, as the Y-content increased, the −40° C. resistance decreased (except for alloy 177Y1, which also showed a low room-temperature exchange current) due to the increased surface area as seen from the increase in double-layer capacitance. The RC product (which excludes the contribution from the surface area) has been plotted in FIG. 7 as a function of the designed Y-content. The curve showed a large increase in the beginning and a decrease afterward as the Y-content increased. The −40° C. electrochemical performance of the 177-series of alloys benefited mainly from an increased surface area. In the 193-series, the increase in the surface area was not so obvious except for 193Y4. Judging from the RC plot in FIG. 7, the decrease in −40° C. charge transfer resistance was not due to the increase in surface area but rather could be attributed to the more reactive surface. The Y-containing secondary phases may play a crucial role in improving activation, HRD, and low-temperature performance.

TABLE 5

Summary of electrochemical properties of alloys in this study.

| Alloy number | Full capacity @ 10$^{th}$ cycle (mAh g$^{-1}$) | High-rate discharge-ability @ 10$^{th}$ cycle | Cycle number reaches 90% HRD | Diffusion coefficient D (×10$^{-11}$ cm$^2$ s$^{-1}$) | Exchange current $I_o$ (mA g$^{-1}$) | Charge transfer resistance @ −40° C. (Ω g) | Double-layer capacitance @ −40° C. (Farad g$^{-1}$) | RC product @ −40° C. (sec) |
|---|---|---|---|---|---|---|---|---|
| 177   | 399 | 89% | 11 | 5.6  | 25.8 | 184 | 0.12 | 22.1 |
| 177Y1 | 359 | 92% | 10 | 10.8 | 5.6  | 261 | 0.29 | 75.7 |
| 177Y2 | 370 | 91% | 8  | 12.4 | 19.1 | 97  | 0.40 | 38.8 |
| 177Y3 | 342 | 94% | 5  | 12.4 | 19.3 | 44  | 0.43 | 18.9 |
| 177Y4 | 313 | 94% | 1  | 12.5 | 16.3 | 42  | 0.56 | 23.5 |
| 193   | 335 | 90% | 6  | 12.1 | 26.3 | 128 | 0.17 | 21.8 |
| 193Y1 | 305 | 91% | 4  | 12.8 | 24.5 | 97  | 0.20 | 19.4 |
| 193Y2 | 310 | 93% | 4  | 33.5 | 31.8 | 74  | 0.18 | 13.3 |
| 193Y3 | 305 | 95% | 2  | 31.9 | 41.6 | 49  | 0.27 | 13.2 |
| 193Y4 | 298 | 98% | 1  | 54.4 | 36.3 | 23  | 0.66 | 15.2 |

The foregoing experimental series showed that the inclusion of a yttrium modifier element in $AB_2$ metal hydride alloy materials typical of those in the prior art significantly improved the performance of those alloys with regard to activation and high rate capability when they were incorporated into metal hydride battery cells. While the experimental series involved several particular groups of alloy materials and a yttrium modifier, in view of the teaching presented herein, this experimental series enables and is predictive of other embodiments of the present invention. For example, in view of the teaching presented herein, one of skill in the art would also appreciate that other modifier elements may be employed. The requirement for these elements is that they be capable of entering the main phase of the alloy and promoting the growth of other secondary phases not seen in the undoped alloy.

The foregoing drawings, discussion, and description are illustrative of some specific embodiments of the present invention but are not meant to be limitations upon the practice thereof. Other modifications and variations of the invention will be readily apparent to those of skill in the art in view of the teaching presented herein. It is the following claims, including all equivalents, which define the scope of the invention.

The invention claimed is:

1. A multi-phase, metal hydride alloy material which includes a modifier element therein, said alloy material comprising:
   a first, main phase, or group of phases, having an $AB_x$ crystalline structure, said first, main phase, or group of phases having a concentration of said modifier element therein which is greater than zero; and
   a second phase which has a concentration of said modifier element therein which is at least 10 times greater than the concentration of said modifier element in said first phase, or group of phases, said alloy being capable of reversibly absorbing and desorbing hydrogen.

2. The alloy of claim 1, wherein the concentration of said modifier element in said second phase is at least 50 times greater than the concentration of said modifier element in said first phase, or group of phases.

3. The alloy of claim 1, wherein the concentration of said modifier element in said second phase is at least 100 times greater than the concentration of said modifier element in said first phase, or group of phases.

4. The alloy of claim 1, wherein said second phase is non-crystalline or does not have the same crystal structure as the main phase.

5. The alloy of claim 1, wherein the concentration of said modifier element in the first, main phase, or group of phases thereof is equal to or less than 4 atomic percent.

6. The alloy material of claim 1, wherein said modifier element is a light rare earth element.

7. The alloy material of claim 1, wherein said modifier element is yttrium.

8. The alloy of claim 1, wherein said alloy includes Ti, Zr, V, Ni, and said modifier element.

9. The alloy material of claim 1, wherein said first phase, or group of phases has a Laves phase crystalline structure.

10. The alloy material of claim 9, wherein said second phase does not have said Laves phase crystalline structure.

11. The alloy material of claim 1, wherein said first phase has an $AB_2$ crystalline structure.

12. The alloy of claim 1 having the general formula of:

$$Ti_A Zr_{B-X} Y_X V_C Ni_D M_E$$

wherein A, B, C, and D are each independently greater than 0 and less than or equal to 50 atomic percent; X is greater than 0 and less than or equal to 4 atomic percent; M is one or more metals selected from the group consisting of Co, Cr, Sn, Al, and Mn; and E is in the range of 0-30 atomic percent.

13. The alloy of claim 12, wherein A, B, C, and D are each independently in the range of 5-50 atomic percent.

14. The alloy of claim 12, wherein M comprises at least two of said metals and wherein no one of said at least two metals is present in said alloy in an amount of greater than 10 atomic percent.

15. A rechargeable metal hydride battery which includes the alloy of claim 12.

* * * * *